Figure 1:
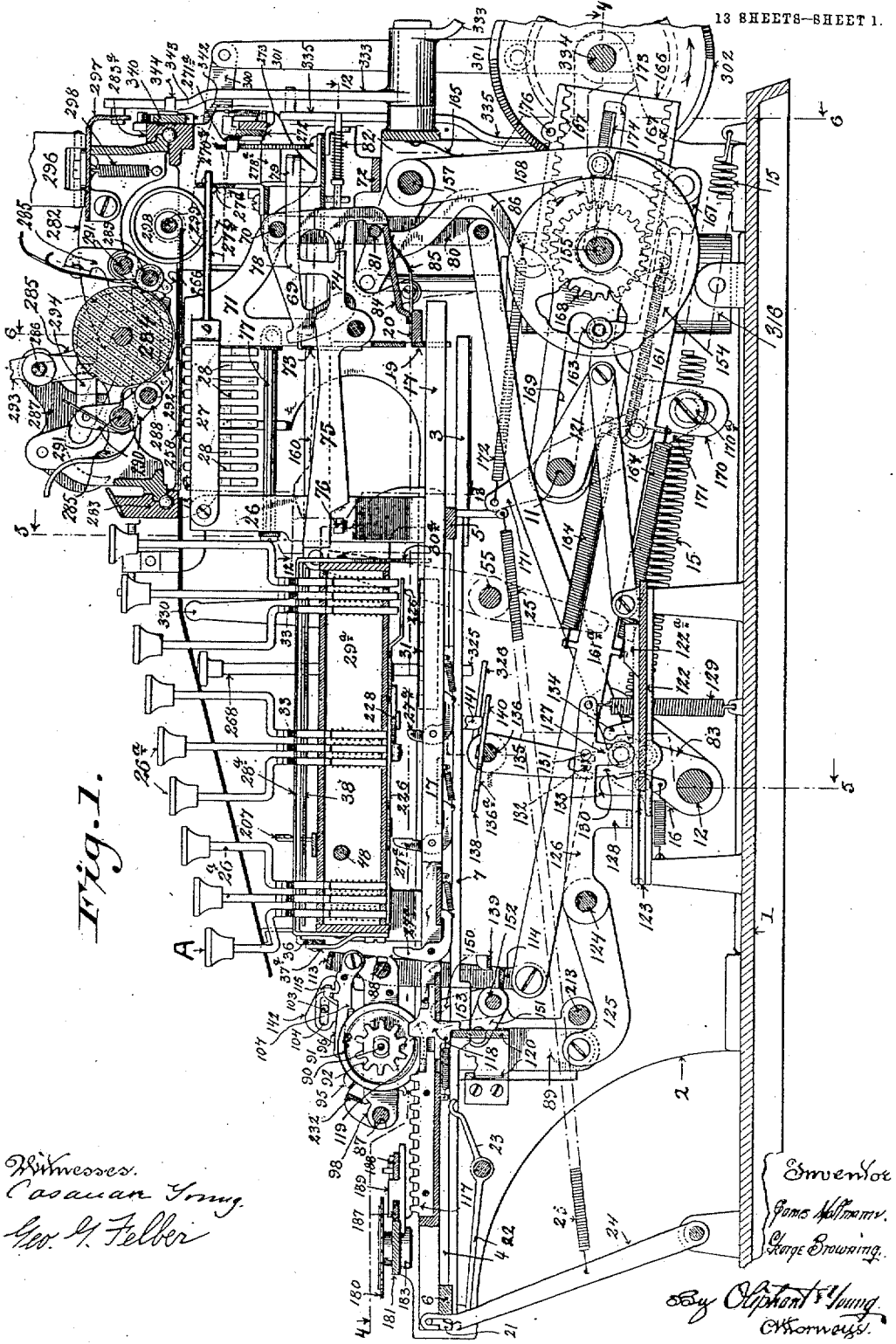

J. MALLMANN & G. BROWNING.
CALCULATING MACHINE.
APPLICATION FILED SEPT. 2, 1909.

980,652.

Patented Jan. 3, 1911.
13 SHEETS—SHEET 1.

J. MALLMANN & G. BROWNING.
CALCULATING MACHINE.
APPLICATION FILED SEPT. 2, 1909.

980,652.

Patented Jan. 3, 1911.
13 SHEETS—SHEET 6.

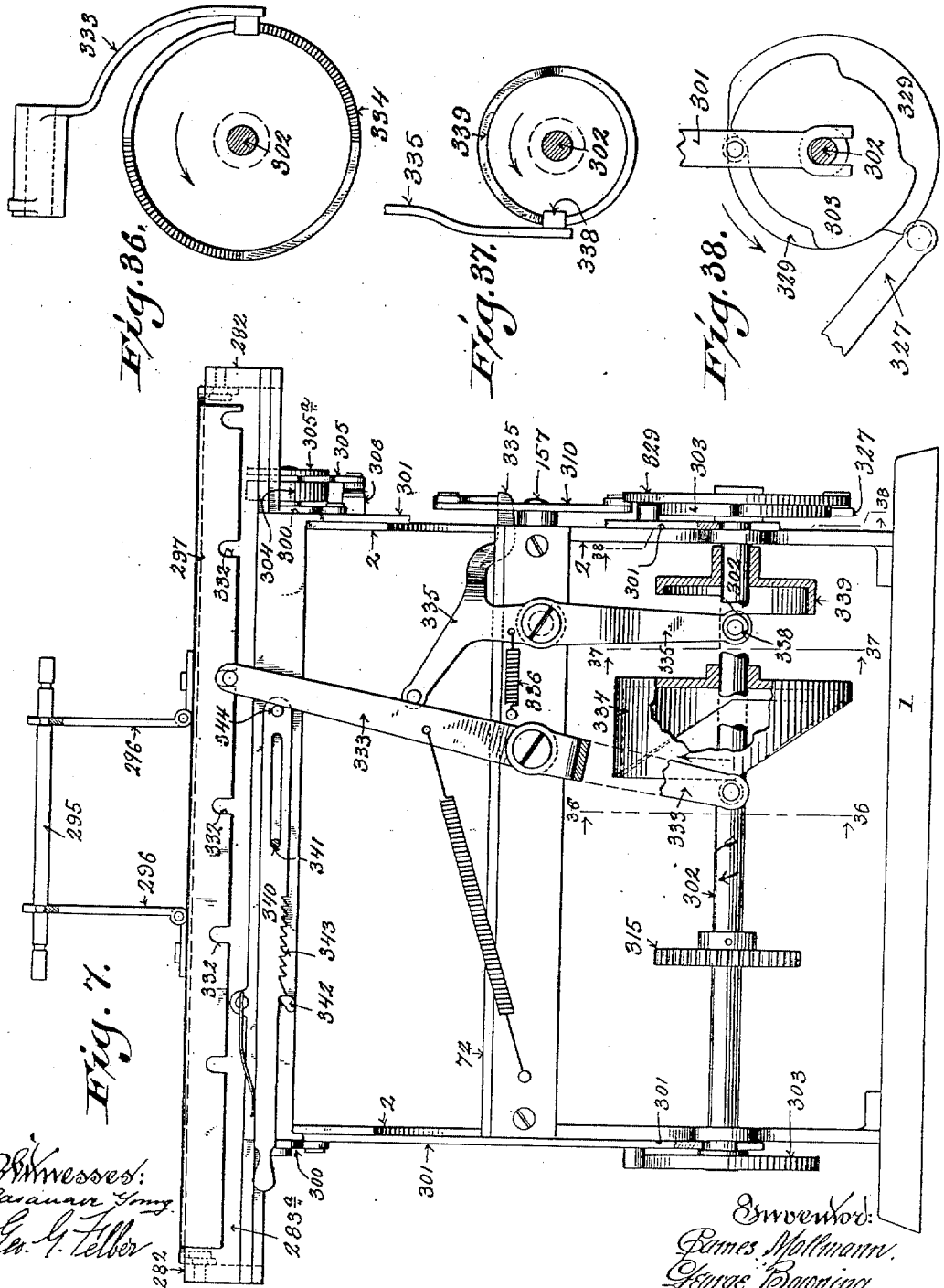

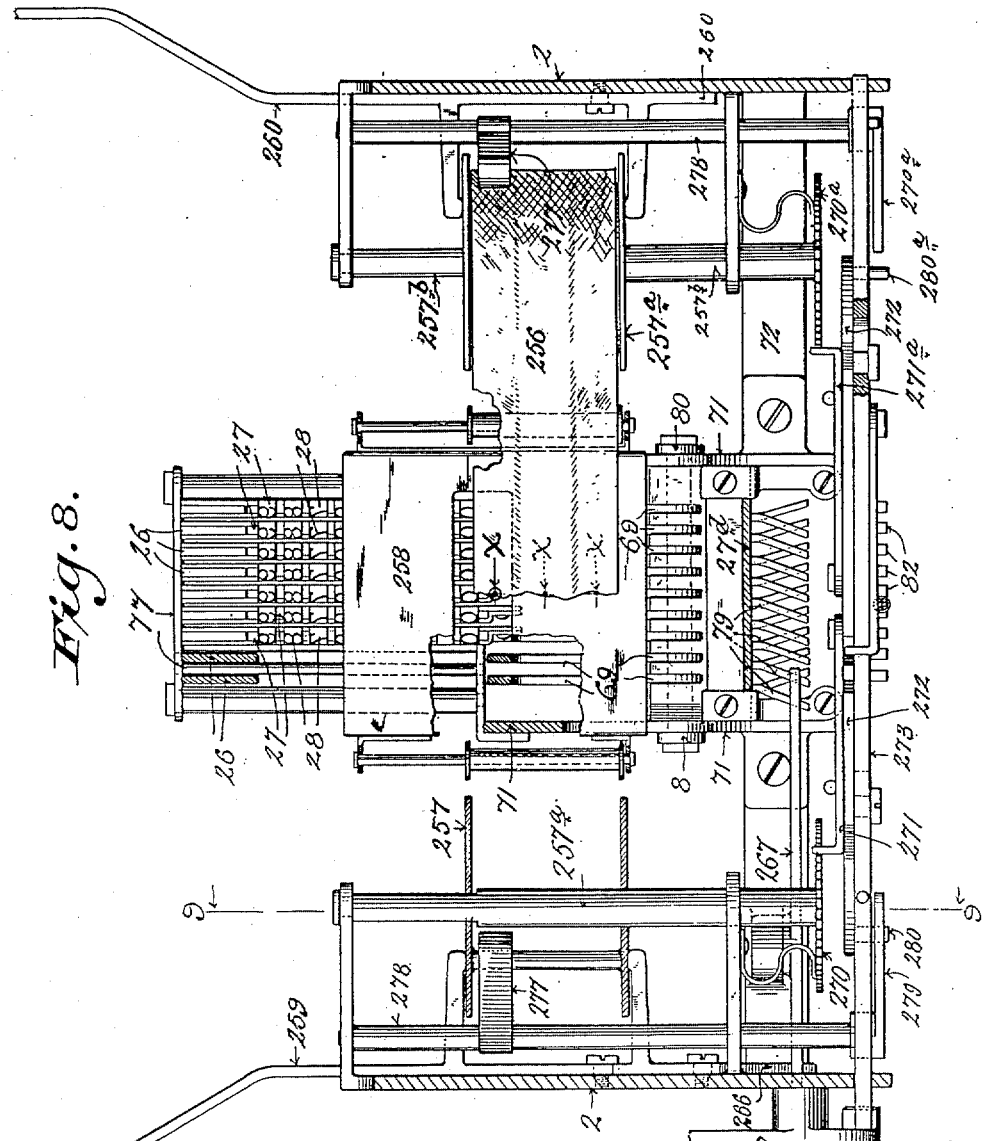

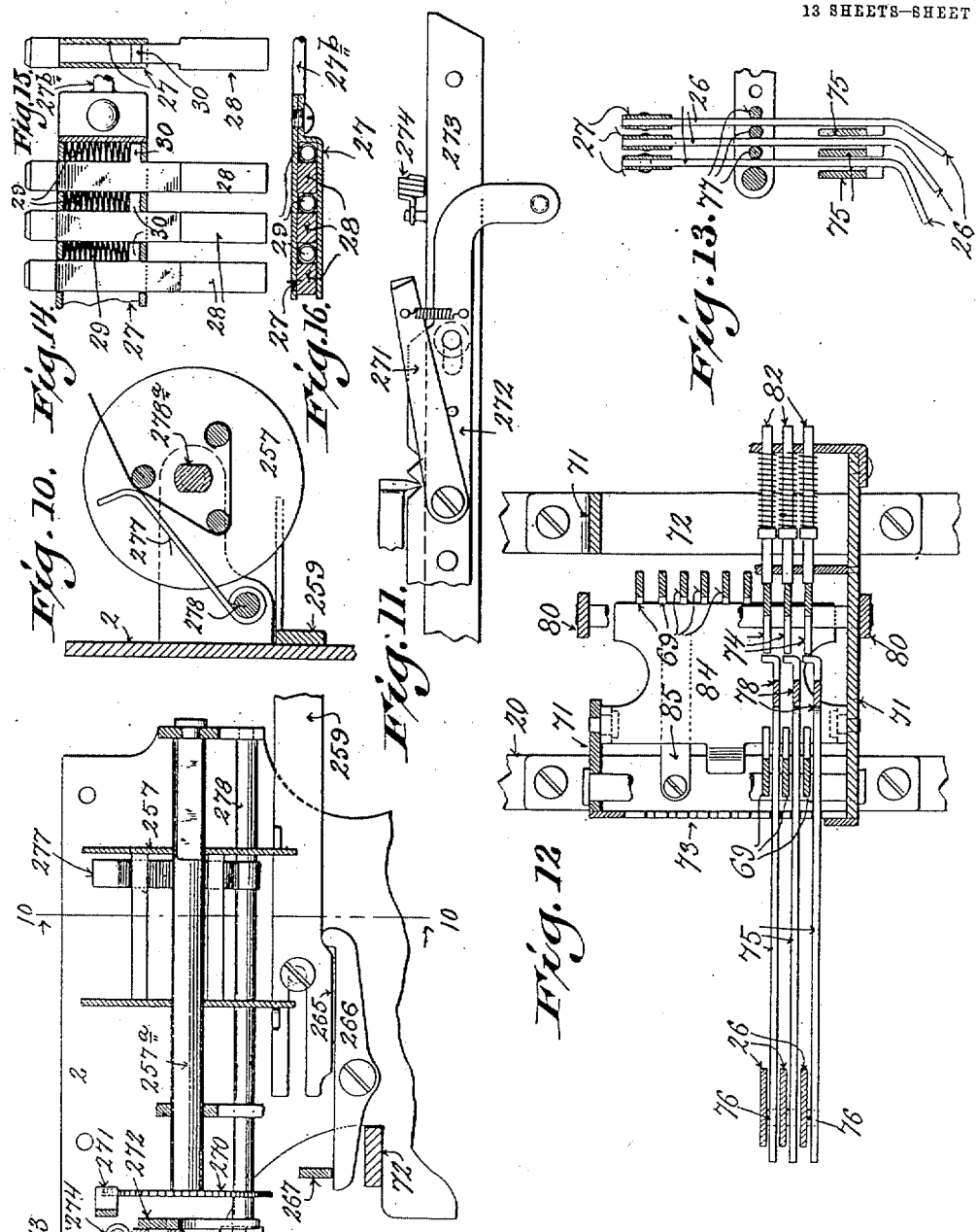

J. MALLMANN & G. BROWNING.
CALCULATING MACHINE.
APPLICATION FILED SEPT. 2, 1909.

980,652.

Patented Jan. 3, 1911.
13 SHEETS—SHEET 10.

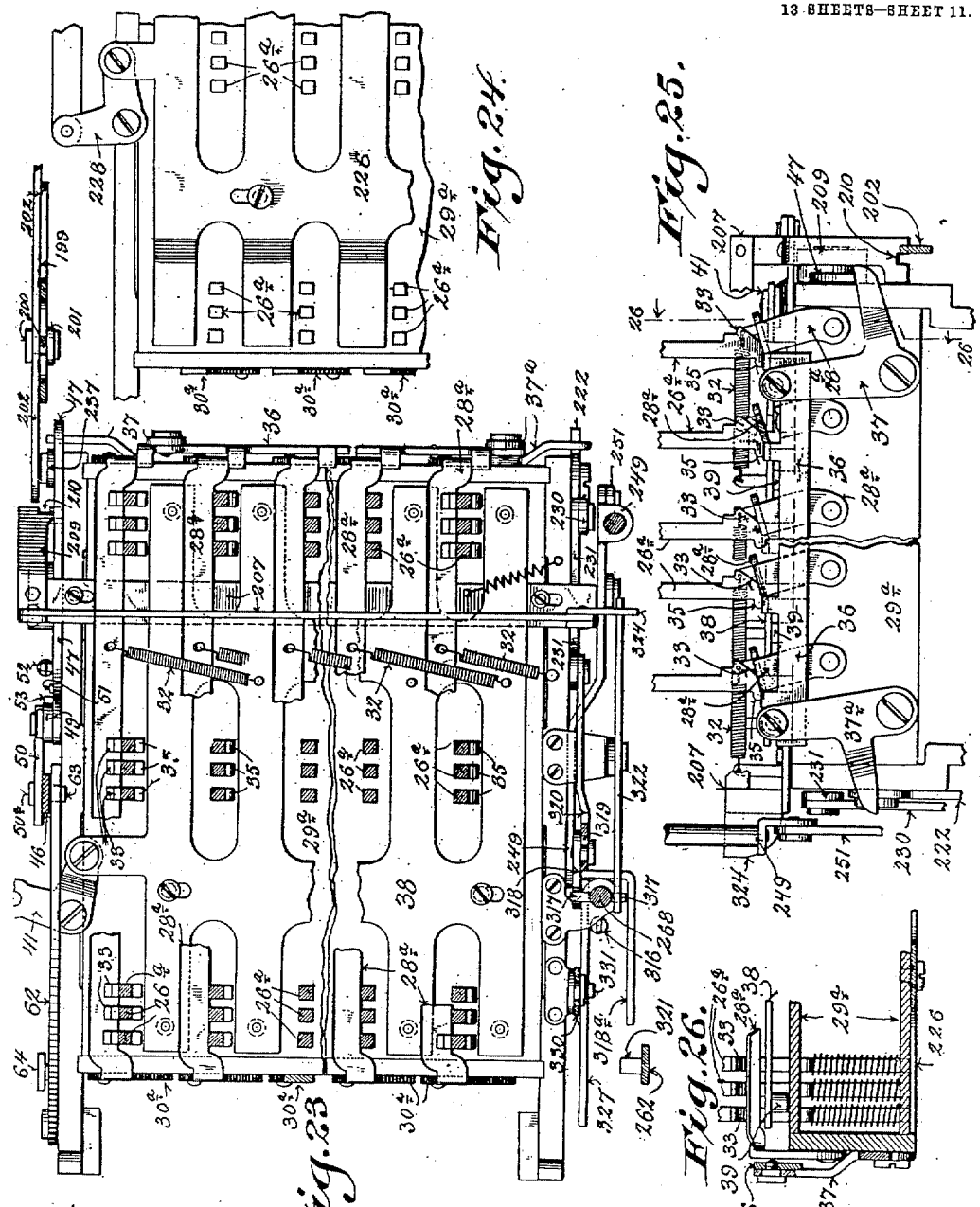

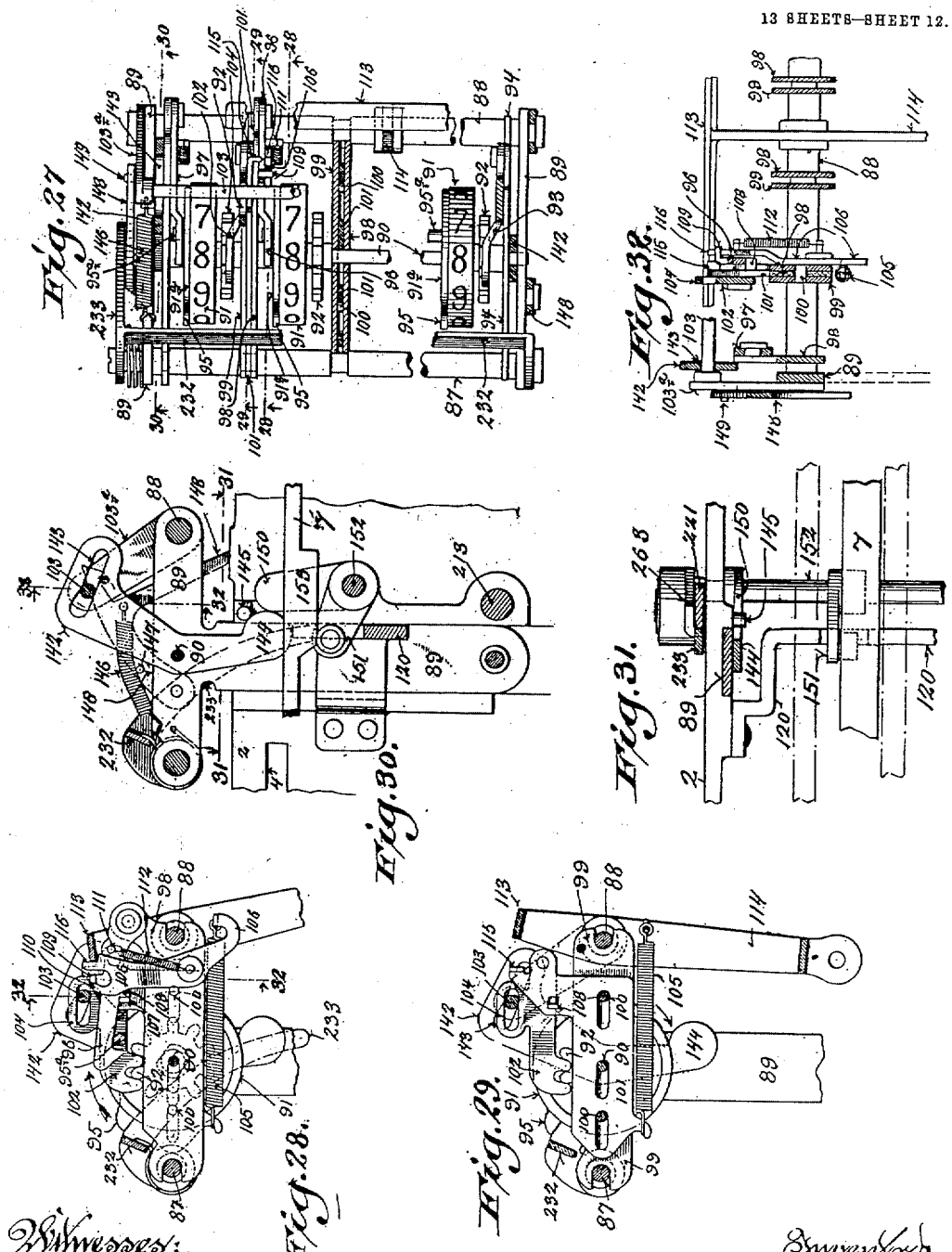

J. MALLMANN & G. BROWNING.
CALCULATING MACHINE.
APPLICATION FILED SEPT. 2, 1909.
980,652.
Patented Jan. 3, 1911.
13 SHEETS—SHEET 13.
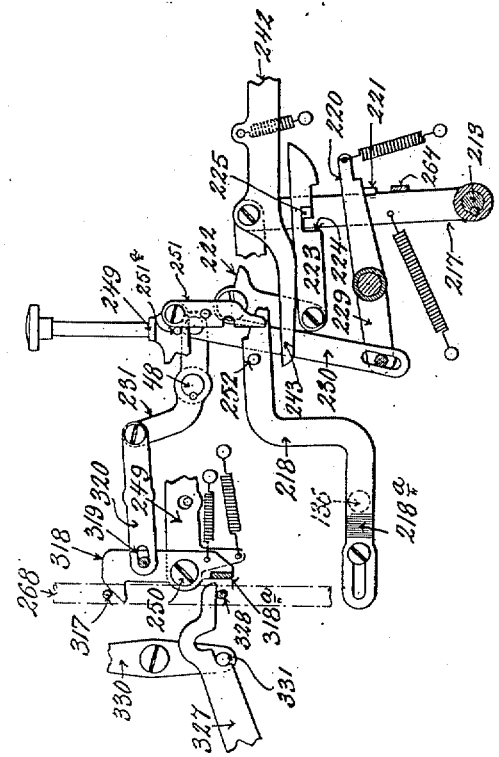
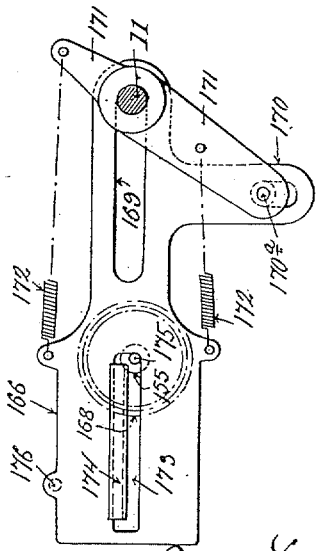
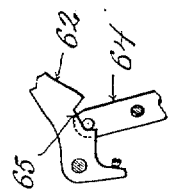

UNITED STATES PATENT OFFICE.

JAMES MALLMANN, OF SHEBOYGAN, WISCONSIN, AND GEORGE BROWNING, OF CHICAGO, ILLINOIS, ASSIGNORS, BY MESNE ASSIGNMENTS, TO STANDARD ADDING MACHINE COMPANY, OF ST. LOUIS, MISSOURI.

CALCULATING-MACHINE.

980,652.      Specification of Letters Patent.      Patented Jan. 3, 1911.

Application filed September 2, 1909. Serial No. 515,889.

*To all whom it may concern:*

Be it known that we, JAMES MALLMANN, a citizen of the United States, and GEORGE BROWNING, a subject of the King of Great Britain, and residents, respectively, of Sheboygan, in the county of Sheboygan and State of Wisconsin, and of Chicago, in the county of Cook and State of Illinois, have invented certain new and useful Improvements in Calculating-Machines; and we do hereby declare that the following is a full, clear, and exact description thereof.

The general object of our invention is to provide simple, accurate and positive actuating mechanism for accomplishing the various results necessary in each of the operations of a registering and recording calculator.

The present invention being especially designed with reference to improving a calculating machine invented by James Mallmann and for which U. S. Letters-Patent were granted to him December 20, 1904, No. 777,797.

In brief the specific objects are as follows: To provide means whereby each calculating-wheel of a total-register-mechanism is actuated by independent stored power in its carrying operation. To convert the oscillatory motion of the power-shaft into intermittent rotary motion in one direction, whereby various timed mechanisms are actuated by a series of rotatory cams mounted upon a counter-shaft. To provide a key-controlled eliminating mechanism whereby the register calculating-wheels are held out of engagement with their actuating racks and an item is printed, but is eliminated from said calculating-wheels of the register. To provide means for automatically shifting the position of the carriage in connection with the eliminating mechanism, whereby eliminated items and registered items are alternately printed side by side or one above the other. To provide a tri-colored ribbon, adapted to be shifted in connection with the eliminating mechanism, whereby the eliminated items are printed in a distinctive color from items registered and recorded. To provide automatic means for reversing the ribbon. To provide a trip-mechanism in connection with the calculating-wheels of the registering-mechanism, whereby the position of the calculating-wheels is controlled with relation to their actuating racks incidental to an addition, total, or sub-total operation. To provide an automatic visible multiplying indicator, whereby the items registered and recorded will show up to a predetermined number, the indicator being thereafter returned to zero. To provide a total-mechanism controlled by a movement of the operating-crank of the machine, whereby the tri-colored ribbon is shifted to print a total in a distinctive color from the registered items and the eliminated items, the multiplying indicator in this instance being returned to zero and the keys locked. To provide a key-controlled item-repeat and key-release mechanism, whereby with one movement, items may be duplicated as many times as desired, another movement of the key-controlled repeat-and-release mechanism, being capable of clearing the key-board of depressed keys previous to a printing and registering operation, should an error occur. To provide a key-controlled sub-total mechanism arranged to hold the calculating-wheels of the total-register in mesh with their respective actuating racks during a sub-total printing-operation, the multiplying indicator being at the same time disengaged from its feed-mechanism. To provide a series of hammer-locking bars in connection with the printing-mechanism, whereby only those hammers will be free to print which are to the right of a locking-bar that has been actuated, these locking-bars being only actuated when a digit is to be printed, except the first two bars which are independently actuated by a shift movement of the ribbon, incidental to a total printing operation being made when the machine is clear, in which case two ciphers would be printed as a clear signal. To provide a simple adjustable paper-feed device and actuating springs for the type-bars, whereby the movement and power of the springs are reduced to the minimum thus increasing their life and efficiency.

With the above primary and other incidental objects in view, the invention consists of the various details of construction and combination of parts as will be clearly set forth hereinafter with reference to the accompanying drawings and subsequently claimed.

Figure 2:
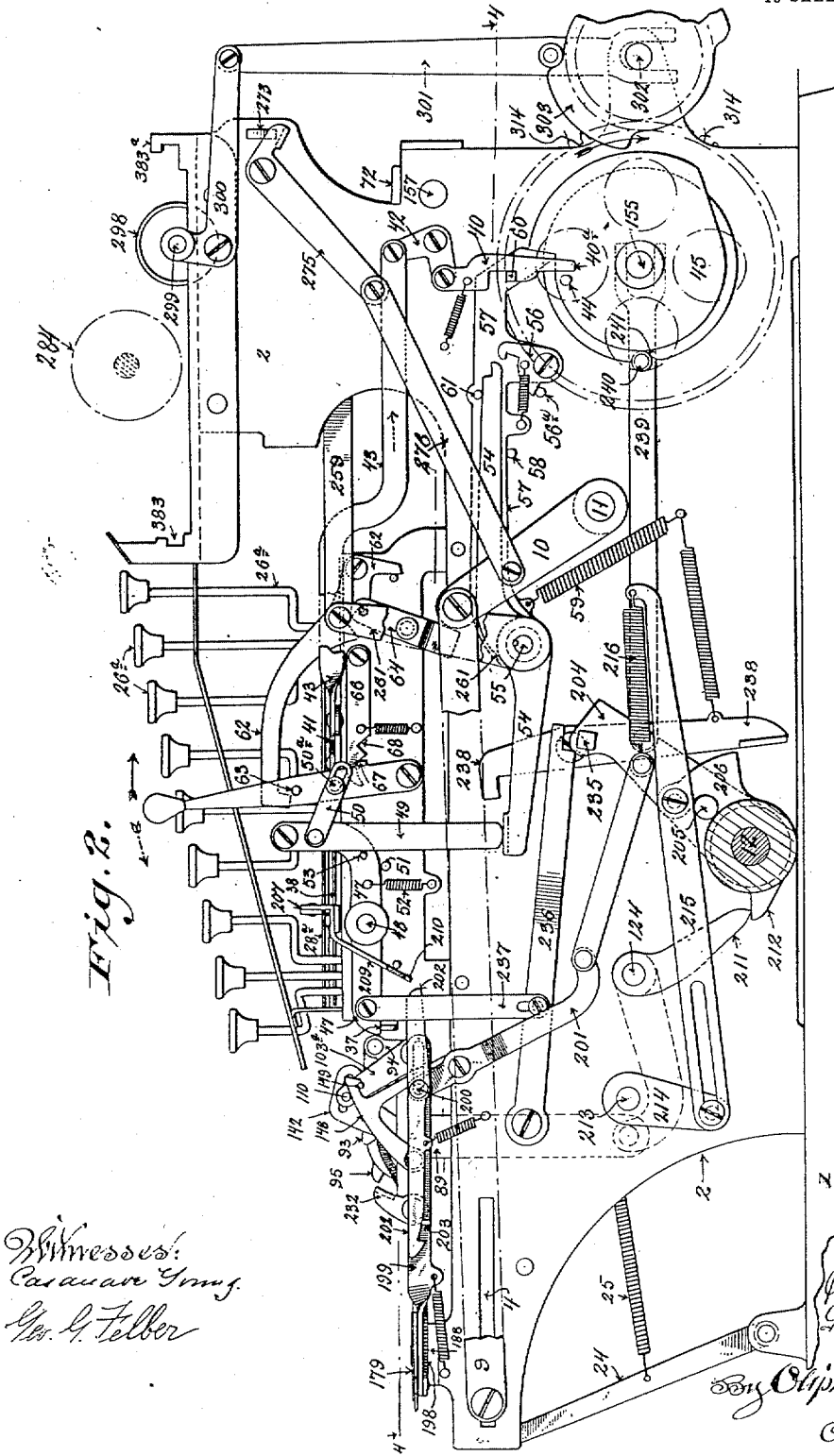
Figure 3:
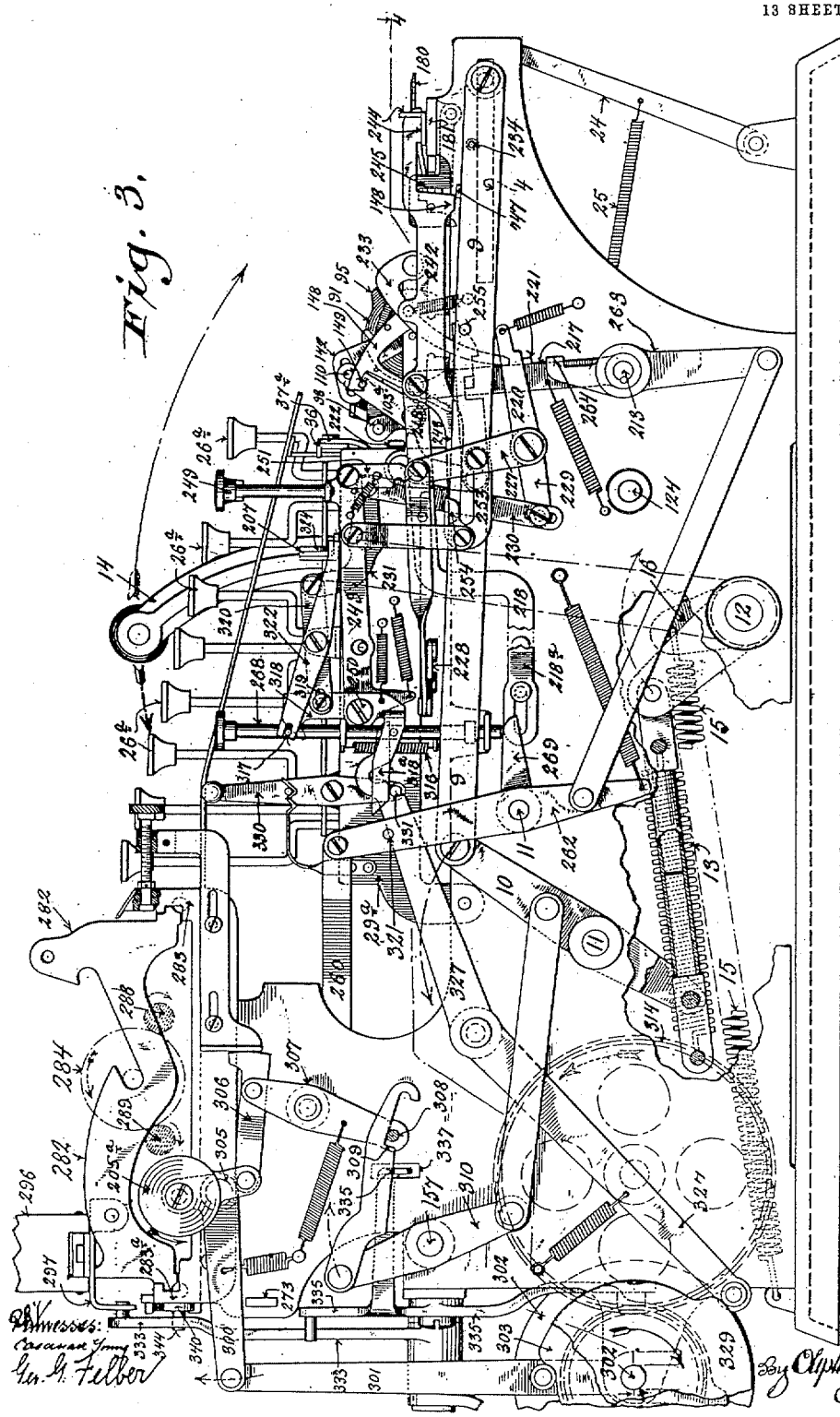
Figure 4:
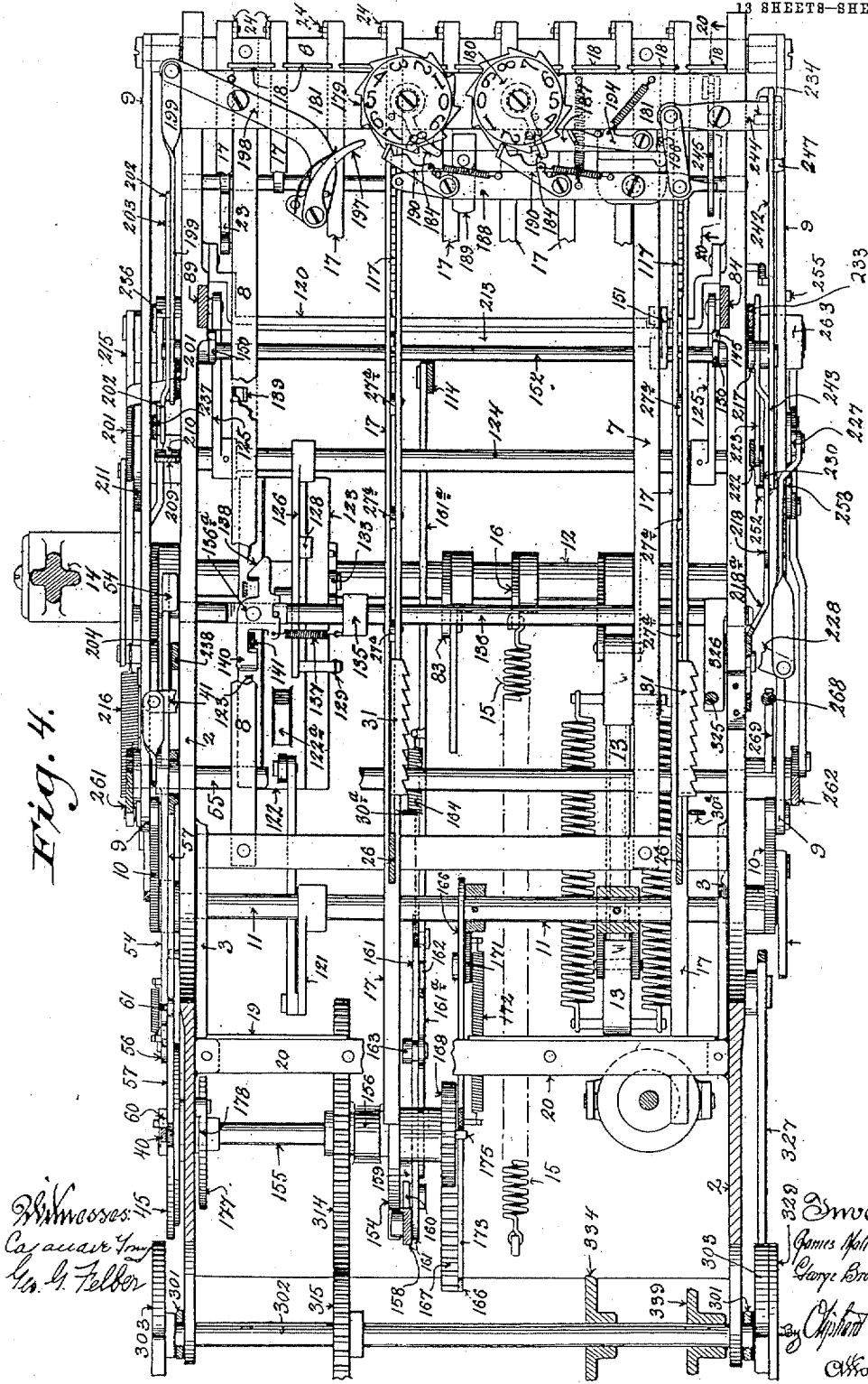
Figure 5:
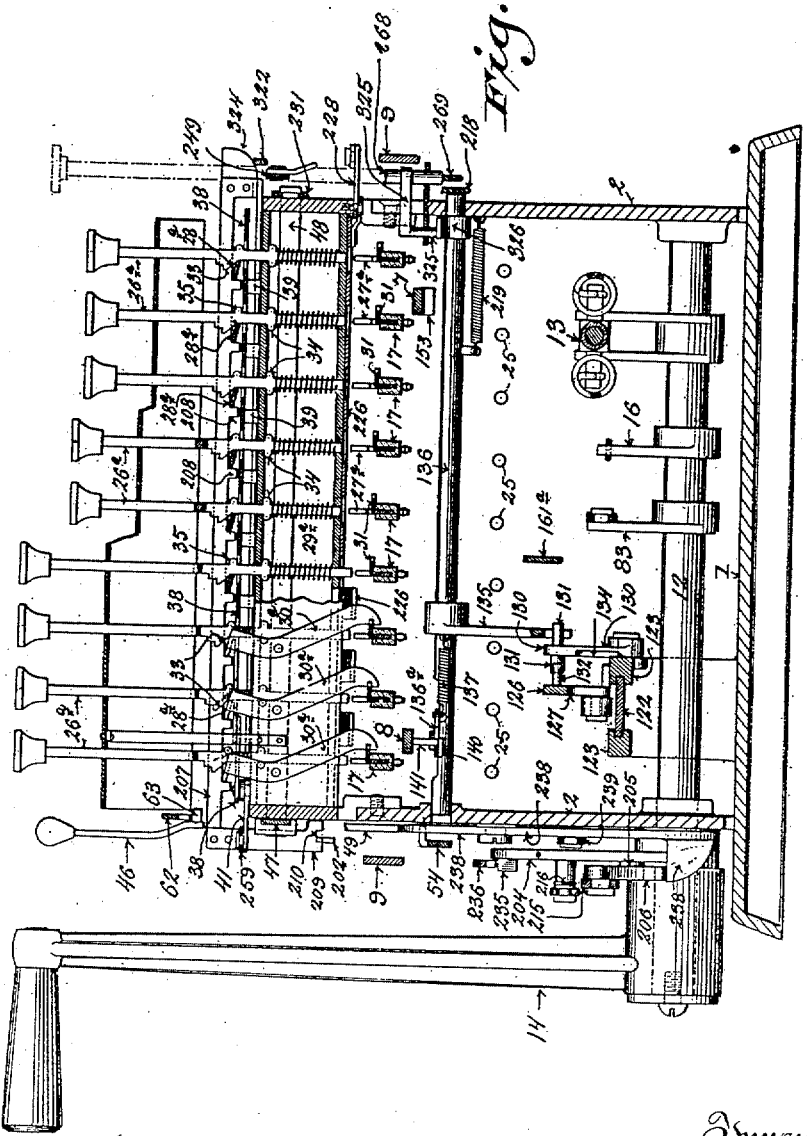
Figure 6:
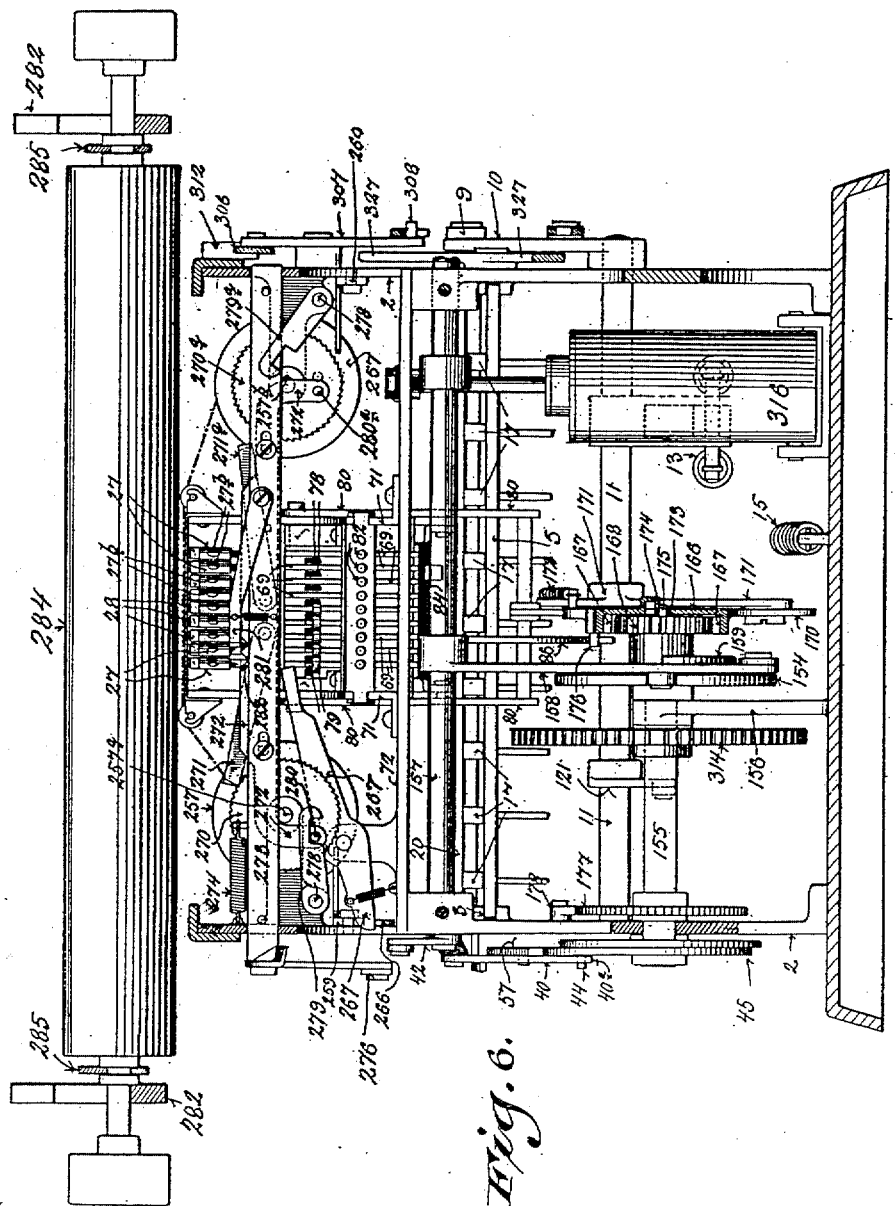

In the drawings: Figure 1 represents a longitudinal section view of a calculating machine embodying the features of our invention with portions removed and portions broken away to more clearly show certain structural features; Fig. 2, an elevation of the right-hand side of the machine with portions removed and other portions broken away; Fig. 3, a similar elevation of the reverse or left-hand side of same; Fig. 4, a plan sectional view of said machine with parts broken away and other parts removed to avoid confusion in illustration, the view being sectioned upon an approximate plane, as indicated by lines 4—4 of Figs. 1, 2 and 3; Fig. 5, a vertical cross-section of the aforesaid machine, as indicated by line 5—5 of Fig. 1, parts back of the indicator section plane being not shown in order to avoid confusion; Fig. 6, a vertical cross-section of the same, as indicated by line 6—6 of Fig. 1, with parts removed and other parts back of the indicator section plane not shown to avoid confusion; Fig. 7, an elevation of the extreme rear of the machine, showing the automatic carriage-shift used in connection with the item eliminating mechanism; Fig. 8, a detail plan view of the printing ribbon shift and feed-mechanism, with parts broken away and parts in section to better illustrate the details of construction; Fig. 9, a detail sectional view of the ribbon-shift and feed-mechanism, as indicated by line 9—9 of Fig. 8; Fig. 10, a detail section of same, as indicated by line 10—10 of the preceding figure; Fig. 11, a detail elevation of a fragment of the ribbon-shift locking-mechanism, the view being taken looking toward the rear of the machine; Fig. 12, a detail sectional plan view of the printing-mechanism, as indicated by line 12—12 of Fig. 1; Fig. 13, a detail section elevation of the printing-mechanism, as indicated by line 13—13 of Fig. 1; Figs. 14, 15, and 16, fragmentary enlarged detail sectional views of the type-carrying plungers and their connections; Fig. 17, a fragmentary plan view of the multiplying item-indicator, with parts broken away and parts in section; Fig. 18, a cross-section of the same; Fig. 19, an inverted plan view of a fragment of the indicator showing one of the indicator-dial return-springs; Fig. 20, a cross-section of said indicator mechanism, the section being indicated by line 20—20 of Fig. 4; Figs. 21 and 22, detail sectional views of one of the paper-feed-rollers and its actuating mechanism; Fig. 23, a top plan view of the key-board mechanism with parts broken away and parts in section to better show the details; Fig. 24, a fragmentary detail of same looking toward the bottom thereof; Fig. 25, an elevation of said keyboard mechanism looking toward the front side thereof; Fig. 26, a detail cross-section of the same, as indicated by line 26—26 of Fig. 25; Fig. 27, a detail plan, with parts broken away and parts in section of the calculating mechanism; Figs. 28, 29, and 30, detail cross-sections of the same upon lines 28—28, 29—29 and 30—30 respectively of Fig. 27; Fig. 31, a detail sectional plan view, as indicated by line 31—31 of Fig. 30; Fig. 32, a detail sectional elevation of the calculating mechanism, as indicated by lines 32—32 of Figs. 28 and 30; Fig. 33, a fragmentary detail elevation of the sub-total mechanism and its various connections, parts being broken away and in section to more clearly illustrate the details; Fig. 34, a detail elevation of the intermittent rotary driving-mechanism for the continuous driven cam-shaft; Fig. 35, a detail view of the actuating cam of the total-register-loading mechanism; Figs. 36, 37, and 38, similar views of the actuating cams of the paper-carriage shift and item-eliminating mechanism, and Fig. 39, a detail view of the key-release locking-lever.

Referring by characters to the drawings, with especial reference to the first four figures thereof, 1 indicates a base provided with right and left hand standards 2 suitably braced and connected to constitute a frame for the support of the various mechanisms of the machine. The standards are provided with rear guide-ways 3 and forward slots 4, into which guide-ways are fitted the ends of rear and forward cross-rails 5 and 6 respectively, of a reciprocative sash-frame, the cross-rails of the sash-frame being connected by longitudinal bars 7 and 8. The ends of the forward cross-rails 5 extend through the slots 4 and have wristed thereto pitmen 9, the opposite ends of the pitmen being similarly connected to crank-arms 10 of a rock-shaft 11 mounted in suitable bearings of the frame-standards. A power-shaft 12 having its bearings also in the frame standards is linked to the rock-shaft 11, by means of a spring-controlled telescopically yielding pitman 13, the power-shaft being actuated in one direction by a hand-crank 14 mounted thereon and conveniently located at the right-hand side of the machine. A master coil-spring 15 secured to the rear end of the base is connected to the power-shaft, through a crank-arm 16 secured thereto, the spring being in opposition to the positive crank-power applied to said power-shaft, whereby the same is returned to its normal position by said spring. By the above described mechanism it will be understood that the sash-frame is reciprocative with each complete movement of the hand-crank back-and-forth. A series of nine independent type-bars 17 are supported upon the cross-rails of the sash-frame, the type-bars being guided and held at their forward ends upon the cross-rails 6, by a spacing comb 18 having teeth overlapping the upper faces of said type-bars, while the rear ends of same are similarly spaced and guided by a comb 19, which comb depends from a cross-brace 20 of the machine frame. The forward ends of each of the type-bars are provided with depending heads 21 adapted to engage the adjacent edge of the cross-rail 6. The heads of the first seven of said type-bars from left to right of the machine are notched to receive a corresponding number of dogs 22, which dogs are oscillatively connected to the machine frame and provided with a pair of contact tails 23 arranged in the path of travel of the cross-rail 6, by which rail they are depressed for the purpose of locking the dogs within the notches of the type-bar heads during a total or sub-total operation, to be hereafter more clearly defined.

Fulcrumed upon a rod carried by the base are a series of independent links 24 having slotted heads which engage pins extending from the heads 21 of the type-bars. To these links and near their fulcrum-points are connected spiral-springs 25, which springs have their opposite ends in connection with the rear cross-rail 5 of the sash-frame. Adjacent its rear end, each type-bar is provided with a vertically disposed arm 26, to which arm in turn is shackled a type-carrier 27 having a series of type 28 vertically reciprocative therein, there being a spring 29 fitted within the carrier, under compression, and arranged to impinge against lugs 30 extending from the type-shanks, whereby said type are held in their normal position below the printing-plane.

The type-carriers as described, and shown in Fig. 6, each have a rod-extension $27^b$ projecting therefrom, the rods being opposite the shackled or pivoted ends thereof and are provided to constitute supports in connection with a fixed apertured plate $27^d$, in which apertured plate said rods have sliding-fit. By this construction the type-carriers are self-supported and not dependent upon the type-bars, which type-bars serve as a means for imparting motion to said type-carriers only. Thus undue side-strain is eliminated from said type-bars, which strain would occur should the type-carriers be in rigid connection with the type-bars, and each part is consequently self-adjusting in its respective bearing, whereby friction is eliminated and smoothness in operation is assured.

The type-characters of each type-bar, as best shown in Figs. 1 and 8 of the drawings, comprise a cipher and the digits from 1 to 9 respectively, the characters being normally so postponed that the cipher, which is the rear character, is one space from the printing-line, and hence the type-bars and type-carriers are moved rearward one to ten spaces to effect a printing-operation. This rearward movement of each type-bar is effected by its coil-spring 25, when the hand-crank is pulled forward to cause a reverse or rear movement of the sash-frame. Thus said sash-frame and type-bars move together until the said type-bars are checked by suitable key-board mechanism or stops. The sash-frame thereafter continues its full rear-stroke and is returned to its normal position by the master-spring 15, during which return the various type-bars are picked up and also returned to their normal position, by the cross-rail 6 coming into contact with the heads of said type-bars. From the foregoing described mechanism it will be understood that the actuating coil-springs 25 of the type-bars are relieved of undue tension, which relief is due to the limited travel of said springs in proportion to the travel of the type-bars and sash-frame, owing to the fact that the stroke of the springs is materially shortened by being connected close to the fulcrum-points of the links. Should one or more of the type-bars travel their full stroke in connection with the sash-frame, the coil-springs of these particular bars would only be subjected to the initial tension plus the tension due to the increased distance traveled by the sash-frame, thus proportionately reducing power required to be applied to the hand-crank in moving the sash-frame rearward. Should the rearward movement of a number of the type-bars be only one space, it follows that their coil-springs 25 would necessarily be stretched to nearly their full working-tension, in which case said springs act as a supplementary power in conjunction with the master-spring to assist the same in performing its function, until such time as the type-bars and sash-frame have assumed their normal positions with relation to each other. Thus the spring-power required to operate these parts is so distributed as to maintain a practically normal equilibrium under varying load conditions, and consequently the tension-strength of the master-spring is materially decreased, thus eliminating sudden shock and insuring a uniform smooth, light-running machine.

As best shown in Figs. 1, 4 and 5 of the drawings, the key-board mechanism primarily consists of a series of nine spring-controlled keys $26^a$ for each type-bar, the key-shanks being alined therewith and above the same in groups of three. Each group of the key-shanks is spaced apart a distance equal to the space between the type, and are designed, when depressed, to come within the path of travel of any one of three spring-controlled stop-dogs $27^a$ common to the group. Each series of three stop-dogs are pivoted to a type-bar, each stop-dog being provided with a tail which normally rests upon the lower face of said type-bar, whereby said dogs are locked when opposed by a depressed key-shank should the aforesaid type-bar be moved rearwardly, the dogs being free to swing, if the bar is moved in a reverse direction. This yield of the stop-dogs prevents snarling of the parts caused through a partial depression of a key rearward of a stop-dog, whereby the type-bar of the partially depressed key is freed and will move past the key-shank before the same has moved downward a sufficient distance to stop said type-bar, the result of which inadvertent movement would lock the aforesaid type-bar and prevent the same from returning to its normal position, provided the aforesaid key was entirely depressed after the type-bar had escaped.

By spacing the keys apart in groups each having a stop-dog, there is no liability of keys of one group interfering with the stop-dog of the next group of keys and, as shown in Figs. 1 and 23, the first stop-dog together with its type-bar is free to move two spaces before locking against the first key, one space being for the purpose of permitting the cipher type to move under the printing-line, while the next space brings the digit 1 to the said printing-line. The next key controls alinement for the type digit 2 and the last of the group of keys the digit 3, and so on successively throughout the remaining two groups of keys, each stop-dog being proportionately spaced apart from the first key of the group to perform its function. The last stop-dog of the series is slightly shorter than those preceding so as to prevent said stop-dog from snarling into the middle series of keys, it being understood that the key-shanks corresponding to this short stop-dog are proportionately longer than those of the remaining groups in order that the same key-stroke distance may be maintained.

As previously stated the ciphers of all type-bars are normally one space forward of the printing-line, and with each initial rearward movement of the sash-frame all type-bars move with said frame the distance of one space, and thereby bring the ciphers to the printing-line automatically. In order to stop the bars so as to effect this cipher alinement, as best illustrated in Figs. 5, 23 and 25, each series of keys are provided with a bail 28ª, which bail is pivoted to the front and rear walls of a box-like casing 29ª constituting a support for the entire bank of keys, which form part of the key-board mechanism. The rear pivoted end of each bail has a depending finger 30ª which finger is arranged to engage and is normally in the path of a horizontally disposed saw-toothed plate 31, the plate being extended to one side of the type-bar and secured thereto. The beveled faces of the plate-teeth are inclined toward the forward end of the machine, as shown in Fig. 5, for the purpose of allowing the type-bar thereof to return to its normal forward position, said saw-toothed plate slipping over the inclined face of the teeth even though said teeth were engaged by the bail finger. The intermediate teeth of the plate 31 are provided for engagement with the fingers in order to check the type-bars from being drawn rearward by their springs 25 at the instant when said type-bars are released by the item register mechanism in completing a total or sub-total operation to be described hereafter.

As best shown in Figs. 1, 4, and 5, when the type-bars are at rest, the bail fingers are located one space rearward of the right-angle face of the last tooth of the plate 31, and hence when any or all type-bars are moved rearward they will be checked by this last tooth thus bringing their respective ciphers to the printing-line. Each bail 28ª is held against the face of its line of keys by an independent spring 32, each key being provided with a projecting tooth 33 having a beveled face inclined downward and merging into the key-stem just above said bail. The key-shanks are held and guided in bearings formed in the bottom and top walls of the key-board casing 29ª and are held in position by means of coil-springs which surround said key-shanks. These coil-springs are interposed between the bottom wall of the casing and lugs 34 extending from the key-shanks, which lugs, in connection with similar lugs 35, above the top-wall of said casing, constitute stops to limit the movement of the aforesaid keys in either direction.

Upon the depression of any key in the line above a type-bar, the tooth 33 of the key-shank will cause the bail-finger to swing clear of the saw-toothed plate and the type-bar can then be moved rearward until checked by said key-shank, thus the character corresponding to the key depressed will be stopped upon the printing-line of the machine, the depressed key in the meantime being locked down by the bail 28ª, which has passed over and engaged the right-angle face of tooth 33. From the foregoing it follows that, if the operator has depressed the wrong key in the line, the error may be corrected by depressing any other key in this line, which depression will cause the bail to again swing outward and permit the coil-spring of the depressed key to restore the same. In order to free depressed keys of the entire bank simultaneously, a universal release-bar 36 is provided, which bar is connected to the ends of corresponding arms of bell cranks 37, 37ª, that are fulcrumed to the right and left hand end of the front wall of the key-board casing, the bar being provided with lugs engaging the bails, whereby said bails are rocked in opposition to their springs when the free arms of either of the bell-cranks 37, 37ª are actuated.

To prevent a key being depressed after a movement of the hand-crank incidental to a printing-operation of an item, the following mechanism is provided: A slidable locking-comb 38, as shown in Figs. 5 and 23 is arranged to be moved under the key-stem lugs 35, the comb being guided and supported upon the upper wall of the key-board casing 29ª, by suitable feet 39. The working edges of the comb are normally clear of the key-stem lugs 35, the said comb being connected to a trigger 40, by bell-cranks 41, 42 and a link 43. The trigger 40 is released by a tail extension thereof striking a pin 44, which pin is carried by a cam-wheel 45, that receives motion, through its connections to be hereinafter described, from the hand-crank. By the above arrangement, it will be understood that the first movement of the hand-crank in a forward direction, as indicated by the dotted arrow in Fig. 3, will cause rotation of the cam wheel 45, in the direction of the arrow as shown in Fig. 2, the cam-pin 44 acting to release the trigger. The springs 32 of the bails 28ª being connected at their opposite ends to the comb 38, will then act to draw the working-edge of said comb against the adjacent faces of all key-stems and under their lugs 35, consequently those keys not previously depressed are locked in their normal position.

A release-and-repeat key 46 as best shown in Figs. 2, 5 and 23 is pivoted to the right-hand side of the key-board casing, and when manually moved forward, this key releases the entire bank of keys, being connected to the universal release-bar 36 before mentioned, through a lever 47 secured to a shaft 48, which shaft passes through bearings in the right and left hand sides of said key-board casing. The forward end of lever 47 extends over the free arm of the bell-crank 37ª, while the rear end of the lever has pivoted thereto a thrust-bar 49, that in turn is connected to the release-and-repeat key by a link 50, having a slotted end engaging a stud 50ª of said release-and-repeat key. The lever 47 is held in normal position against a stop-pin 51, by means of a coil-spring 52, another stop-pin 53 which projects from said lever, being provided to limit forward movement of the thrust-bar when acted upon by the release-and-repeat key. It is obvious from the foregoing, if the release-and-repeat key is moved forward, as indicated by the dotted arrow, link 50 will cause a lift of the lever 47, the free end of which lever will depress the adjacent bell-crank 37ª, and thereby rock all of the bails 28ª, so as to simultaneously effect a release of the entire bank of keys, the release-and-repeat key, being returned to its normal position of rest by the spring-controlled lever 47. It follows that provision must be had for automatic release of the keys after a printing-operation. This is accomplished by a key-release lever 54, which lever for convenience is loosely fulcrumed upon a ribbon-shift shaft 55 mounted in bearings of the frame-standards 1, as best shown in Figs. 2 and 4 of the drawings. One arm of the key-release lever extends rearward and is provided with a foot that extends under the thrust-bar 49, its opposite arm being formed with a nose-extension adapted to be engaged by a spring-controlled latch 56, which latch is pivoted upon a dog 57, that is also loosely fulcrumed upon the ribbon-shift shaft. When the machine is at rest, the dog 57 is held against a stop-pin 58 by a heavy tension spring 59, the end of said dog being formed with a depending nose which rests upon the low face of the cam-wheel 45 and at its junction with the high face thereof, the junction between these surfaces being radially disposed so as to form an abrupt drop. Both the low and high faces of the cam-wheel 45 are concentrically disposed with relation to the cam-wheel axis, the low face being extended for approximately half of the cam circumference, at which point it gradually rises to the high face thereof. A lug 60 projects from the dog-nose and normally engages a notch of the spring-controlled trigger 40, whereby the latter is locked and through its connection holds the comb 38 clear of the key-stems. The dog 57 being at rest, as shown in Fig. 2, its spring-controlled latch 56 engages a pin 56ª carried by the frame-stand and the latch is thus held away from the nosed end of the key-release lever 54, the said key-release lever being engaged by a pin 61 of the said dog, whereby the rear arm of the aforesaid key-release lever is held in contact with the end of the thrust-bar 49. Motion being imparted to the cam-wheel 45 (in the direction as indicated by the arrow) incidental to a recording and printing operation, will cause the pin 44 of said cam-wheel to immediately trip the trigger 40, with the result as previously described. There will be no further change of the position of the parts until the dog 57 has been lifted in opposition to its spring 59, by the rise in the cam, at which time the latch 56 being lifted from its seat upon the pin 56ª, is free to snap over the nosed end of the key-releasing lever, the latter having retained its original position. Just as the machine completes its operation, the abrupt face of the cam-wheel comes to rest and permits spring 59 of the dog to act, thus seating said dog in its normal position and during this interval, the latch 56 has also drawn down the key-releasing lever 54, which action causes the opposite end of this lever to lift and exert pressure upon the thrust-bar 49, to thereby release all keys in a similar manner to that described in connection with a manual release. Owing to the fact that the link 50 is in slotted connection with the release-and-repeat key, the thrust-bar 49 is capable of lifting to effect a release independently of the release-and-repeat key. It is obvious that the latch 56 will be freed from the key-release lever 54, by striking its pin 56$^a$, and that owing to the tail-extension of the trigger 40, which is primarily for engagement with the cam-wheel, the said trigger when released will ride up and rest against the lug 60, in which position the trigger-notch will be caught by said lug 60 as the dog rises and thereafter be restored to its normal position.

To prevent a manual release of the keys by the release-and-repeat key 46 after a registering or recording operation has been started, we provide a gravity-controlled locking-dog 62, (see Figs. 2 and 23) which is pivoted to the right-hand side of the casing 29$^a$ and has a hooked end that extends over, but is normally clear of a pin 63 carried by the said release-and-repeat key. The locking-dog 62 is held in its position clear of the pin 63 by a tappet 64, which tappet is also pivoted to the casing. This tappet is provided with a pin at one end which engages a notch 65 formed in the locking dog near its pivotal point, the opposite end of said locking-dog being disposed in the path of the travel of one of the crank-arms 10, by which it is operated and held as the said crank-arm assumes its normal forward position of rest. Owing to the fact that motion is imparted immediately to the crank-arms upon starting the machine in operation, it is evident that the tappet 64 when relieved of the crank-arm strain will assume a vertical position, caused both through its own gravity and pressure of the gravity-dog 62, due to the inclined face of the notch therein acting upon the tappet-pin. This movement of the tappet consequently permits the hook-end of the locking-dog 62 to drop over the pin 63 and thus check any forward motion of the release-and-repeat key until such time as the parts have again assumed their position of rest, as shown in Fig. 2 of the drawings. The release-and-repeat key 46 is also capable of being manually set and locked in a reverse direction from its normal position previously mentioned, whereby any keys which have been depressed for a registering-and-printing operation may be held down indefinitely and the amount of the items indicated by said keys repeated as often as desired, thus the release-and-repeat key when moved in a forward direction from its normal position (as indicated by the dotted arrow) constitute a release for the entire bank of keys, and when moved in a reverse direction (as indicated by the arrow in full lines) this key in effect becomes a repeater. In consideration of the various movements of the release-and-repeat key, provision is made whereby the latter is held in its normal position. As shown in Fig. 2, this is accomplished by means of a spring-controlled detent 66, which detent terminates with a curved end that impinges upon a lug 67 forming part of the release-and-repeat key, by means of which lug and detent the key may be moved forward and backward under a slight resistance sufficient to hold said key. A V-shaped notch 68 of the detent is provided to receive the lug 67 of the release-and-repeat key, when the latter is swung over to effect a repeating operation, the notch being of sufficient depth to lock the said key in its repeating position. The throw of the release-and-repeat key is of such distance that its stud 50$^a$ will strike the end of the slot in link 50 and thus cause the thrust-bar 49 to swing rearward so as to clear the same from its engaging position with the foot of the key-release lever 54. The thrust-bar being clear of the releasing-lever foot, it is apparent that should the said releasing-lever be actuated by the automatic tripping-mechanism in connection with the cam-wheel 45, the aforesaid lever would not release any depressed keys owing to its disengagement with the thrust-bar through which release of the keys is effected.

As best illustrated in Figs. 1, 8, 12, and 13, the printing or recording mechanism consists of a series of independently actuated bell-crank hammers 69 having their heads nested under the printing-line, and also in line with the vertically disposed arms 26 of the type-bars, to which arms the type-carriers 27 are shackled, they being also correspondingly nested, whereby the type 28 and hammers are brought together and conveniently spaced the width of a character apart. The hammers are loosely mounted upon a rod 70 fixed in brackets 71, which brackets are supported upon the cross-bar 20 of the machine frame and a similar cross-bar 72, the latter being also a component part of the frame. The heads of the hammers which constitute horizontal arms of the bell-cranks are weighted and guided in a suitable comb-plate 73 connecting the brackets, the opposite arms of the hammers being vertically disposed and are provided with projecting locking-lugs 74, arranged to be opposed by the hammer locking levers 75. These levers are fulcrumed upon a rod carried by the brackets 71 and forward of the hammers, said levers being spaced between the latter and corresponding in number thereto. The forward ends of the hammer-locking levers 75 are similarly spaced between the vertically disposed arms 26 of the type-bars, there being lugs 76 projecting from these arms for engagement with beveled faces of the levers 75, which beveled faces are located the distance of one space from said lugs when the type-bars are in their normal position of rest. The hammer-locking levers 75 are guided by depending teeth of the comb-plate 73 before mentioned, the vertically disposed arms 26 being similarly guided by a grid 77, that is secured to the brackets 71, front and rear straps of which grid constitute stops for said arms 26 in either direction. Finger-extensions 78 of the hammer-locking levers extend rearward of the hammers, being provided with ends 79, split horizontally and spread apart in opposite directions, the upper split section of each finger being extended to the right and overlapping the lower split section extending to the left of the next finger. The lower split section of the first hammer-locking lever from right to left of the machine, and the upper split section of the next adjacent finger are soldered or otherwise secured. Thus these fingers operate to effect a release of the hammers together, so that if an item in units is printed, the next in higher order or tens hammer locking lever will simultaneously release the printing-hammer corresponding thereto and print a cipher indicating the decimal thus .04. The remaining seven hammer-locking levers from right to left are independent of each other, but owing to their overlapped end-sections should the last hammer-locking lever be depressed all levers to the right thereof or of lower order would also be depressed and permit the ciphers to be printed, which ciphers are all moved back one space to the printing-line as before stated upon the initial movement of the hand-crank and type-bars. This initial movement of the type-bars of one space to bring the ciphers to their printing-line however has no releasing effect upon the hammer-locking levers, and hence the necessity of the overlapping finger sections whereby the said levers are controlled when only ciphers are to be printed back of the digit. A yoke 80 is loosely mounted upon the ends of rod 70 exterior of the bracket 71, the yoke being provided with a universal rod 81, arranged to engage the vertically disposed arms of the bell-crank hammer and retract the same to the position shown in Fig. 1, against the pressure of a series of spring-controlled plungers 82, which plungers are reciprocatively mounted in bearings of a framing carried by the brackets 71. Oscillative motion is imparted to the yoke 80 by a crank 83 fast on the power-shaft, which crank is in link-connection with the lower end of said yoke. After the hammers have been retracted by the yoke they are all locked in this position by a universal tripper-plate 84, which is designed to catch under the ends of the vertically disposed bell-crank arms of the hammers. The tripper-plate 84 is pivoted to the forward portion of the brackets 71, being held in its normal locked position against the universal rod 81, by means of a leaf-spring 85, and depending from said tripper-plate is a releasing-arm 86, which arm is adapted to free the printing-mechanism when actuated.

To print the item 1.00, for example, (see Fig. 1) the first key in the third line of the bank would be depressed, a forward pull of the hand-crank causes all type-bars to move forward one space with the exception of the type-bar controlled by the depressed key. This type-bar will move two spaces being checked by the key-stem and its corresponding type is thereby brought to the printing-line. The lug 76 of arm 26 of the type-bar having moved rearwardly a distance of two spaces will consequently engage the bevel face of the corresponding hammer locking lever, causing the same to lift and depress the opposite end thereof. This action frees the hammer controlled by the actuated locking-lever and at the same time the finger at the end of said locking-lever will cause a depression of the two hammer locking levers to the left thereof of lower order, thus the hammers necessary to print the ciphers to the left of the unit, which were locked, are now free to print. The lugs 76 of the hammer locking levers, which release the last mentioned hammers for printing digits were stopped at a point just clear of the beveled faces of said locking levers and hence the same were not freed by said lugs. The forward pull of the hand-crank causing power-shaft 12 to rotate therewith and through its connection a forward motion of the yoke 80. The yoke movement carries its universal rod 81 clear of the path of travel of the vertical arms of the bell-crank hammers 69 and at the completion of the forward stroke of the hand-crank, the tripper-plate 84 is withdrawn. The hammers not checked by the hammer locking-levers 75 are now forced upward by their spring-controlled plungers, their stored power being amplified by momentum causes a quick blow upon the type, the impact thereby lifts said type to effect a printing-operation of the before mentioned item 1.00. A return of the hand-crank to its normal position causes the yoke 80 to restore the hammers which movement also compresses their spring-controlled plungers. At the completion of the yoke-restoring movement, the tripper-plate will snap back into position, as shown in Fig. 1, due to its spring-pressure.

Referring to Fig. 1, and Figs. 27 to 32 inclusive, the total register-mechanism is supported in a frame comprising parallel side rods 87, 88 connected by T-shaped brackets 89, the stems or shanks of which T-shaped brackets being fitted into vertical guideways constituting part of the frame-standards 1 of the machine. A fixed spindle 90 extends across the frame being secured to the brackets 89, upon which spindle is loosely mounted a series of calculating-wheels 91 carrying pinions 92, the said calculating-wheels corresponding in number to the type-bars over which they are alined and being provided with characters upon their faces corresponding to the type-characters. The pinion 92 of the first or unit calculating-wheels from right to left of the series is provided with a locking pawl 93 pivotally mounted upon a fixed plate 94 carried by the frame side-rods and is spaced apart from the adjacent T-shaped bracket. Secured opposite the pinion side of all calculating wheels of the series are metallic disks 91$^a$ each having a toothed extension 95, which toothed extensions project above the faces of all wheels between their cipher and digit characters. Each disk 91$^a$ is also provided with a horizontally disposed pin 95$^a$ for engagement with the heads of tripping-dogs 96, the head being provided with a beveled face against which the pin 95$^a$ acts when moved in one direction. The tripping-dogs 96 are adapted to be actuated in conjunction with a transfer or carrying operation from one calculating-wheel to the other progressively throughout the series with the exception of the last calculating-wheel of the series. This last calculating-wheel however has an ordinary spring-controlled dog 97, the function of which is simply to prevent overthrow or reverse motion of the wheel, the said dog being pivoted to a transverse plate 98 secured to the frame-rods 87 and 88. One of the plates 98 is also similarly secured between each of the intermediate calculating-wheels, together with a transverse plate 99, which plate is spaced apart from the first named plate by shouldered studs 100, to form a series of frames for a corresponding series of carrying mechanisms. The entire series of frames are centrally apertured to form bearings for the spindle 90 and incidentally constitute spacers against which the hubs of the several calculating wheels abut.

A reciprocative carrying-plate 101 having slotted apertures through which the spindle 90 and studs 100 extend is fitted between each pair of plates 98, 99, the carrying-plate being guided and held by the said lugs as best shown in Fig. 29 of the drawings. Each plate 101 has an upwardly extending head, to which head is pivoted a toothed feeding-pawl 102 similar in design to the locking pawl 93 previously mentioned. The toothed ends of both the feed-pawls 102 and the locking-pawl 93 normally engage the teeth of the adjacent pinions of the calculating-wheels, but are designed to be raised from such engagement by a bail 103, which bail passes through horizontally disposed slotted ears 104 of all of the pawls, the bail ends 103$^a$ being hung upon the headed ends of the frame side rod 88. Each reciprocative carrying-plate 101 is connected by a coil-spring 105 to one arm of a latch 106, the latch being mounted on a pin fast in the adjacent plate 98, thus the tendency of the spring is to draw the carrying-plate and its feeding-pawl 102 rearwardly and thereby rotate the pinion of the calculating-wheel with which it is engaged. The tripping-dog 96 of the carrying-section however normally opposes the tension of the spring 105, said tripping-dog being controlled by the pin 95$^a$ of the opposite calculating-wheel and is provided with a tooth 107, against which tooth a lug 108 extending from the head of the carrying-plate abuts. The upper edge of the tripping-dog 96 has a knife-edged tooth 109 extending therefrom, the face of which tooth being normally slightly overlapped and engaged by a finger 110 of the latch 106, (as shown in Fig. 28 of the drawings) the tendency of the coil-spring 105, through its connection, being exerted to press the finger and tooth together. A pin 111 extends from the tripping-dog, to which pin is connected a coil-spring 112, the opposite end of the spring being, for convenience, attached to the fulcrum pin of the latch 106, the pin 111 also serving as a stop, against which said latch abuts when tripped.

A universal loading-bar 113 is fulcrumed upon the side-rod 88 having a depending operating shank 114, the loading-bar being provided to restore the several carrying-mechanisms of the calculating-wheels to their normal position, as clearly shown in Figs. 28 and 29. The loading-bar when moved forward engages a shoulder 115 of the carrying-plate head and a projecting spur 116 of the latch, the carrying-plate and tripping-dog, being thereby locked as shown. The loading-bar is then moved rearwardly by a time mechanism to be hereinafter described, for a slight distance and stopped in order to permit the latch 106 to recede and perform its function in connection with the tripping-dog. In Fig. 28, this loading-bar is shown in its full forward or loading position, while in Fig. 29 the said bar has been fully retracted. Otherwise the parts as shown in above mentioned views are relatively in the same position assumed when the calculating-wheels are at zero, the pin 95$^a$ of a forward wheel being in section directly under the tripping-dog. Should the calculating-wheel which carries the pin 95$^a$ (Fig. 28) be rotated nine spaces or nine-tenths of a revolution in the direction as indicated by the arrow, the parts will all remain in the position shown except pin 95ª, which will now be directly in front of the beveled face of the tripping-dog having made all but one-tenth of a revolution. If this same calculating-wheel is again moved one or more spaces, the first impulse causes the pin 95ª to lift the tripping-dog 96, the loading-bar in the meantime having receded a short distance, permits coil-spring 105 to force the upper portion of the latch 106 rearward until checked by the pin 111 of the locking-dog. The pin 95ª having passed under the tripping-dog head thereby frees the tooth 107 of said dog from the lug 108 of the carrying-plate head. The dog will then drop, by gravity, and is caught by the lower face of its tooth 109, which tooth rests upon the top of finger 110 of the latch and thus prevents reëngagement. As soon as the tooth 107 of the tripping-dog has released the carrying-plate, the said plate also recedes slightly until checked by the loading-bar, this movement having no effect other than to throw the power of the spring 105 upon said bar, which bar when finally released by time-mechanism, to be described hereinafter, is moved to its rearward limit by the stored power of said spring 105, this carrying-plate being also moved in the same direction until checked by the end of its slotted apertures contacting with the studs 101. Thus the carrying plate is moved by its spring one space together with the feed-pawl 102, which pawl is in pinion-gear-connection with the next calculating disk to the right or of higher order and thereby moves this calculating-wheel the distance of one space. The two calculating-wheels upon opposite sides of the carrying section just described being previously set at zero will consequently now show .10, it being understood that a slot in the cover (not shown) of the machine will disclose all calculating-wheels which appear thereunder at zero when said wheels are clear of registered items.

All calculating-wheels of the series are operated in a similar manner to that just described with the exception of the unit calculating-wheel, which wheel is located at the extreme right of the machine, as best shown in Fig. 27 and requires no carrying mechanism. The pinions 92 of the calculating-wheels are provided with ten teeth which correspond in number to the characters upon the faces of said wheels and, as shown in Figs. 1 and 29, when the register-mechanism is at rest, each of these pinions are suspended above a ten toothed rack 117 carried by the corresponding type-bar, with which racks the pinions are adapted to mesh. The pinions are locked by the feed-pawls 102 in such position, that an imaginary vertical line through the pinion axis will intersect the indental space midway between the two lower teeth of said pinion, the first engaging tooth of the racks being forward of the imaginary line, a distance equal to the space two teeth. A slidable safety-block 118 is also guided in each type-bar rearward of the toothed rack 117, the block being in tongue-and-grove connection with a reduced end of the rack-base and is provided with a vertical face 119, adapted to engage the outside face of the adjacent tooth of the pinion as said pinion rises and falls when disengaging or engaging the rack 117. A depending lug of the block extends through a slotted aperture of the type-bar for engagement with a brace-bar 120, which bar extends across the machine frame, the lug being connected by a forwardly disposed coil-spring to said brace-bar. When the machine is at rest there is a space between the tongue and grooved ends of the rack and block, equal to the distance between two rack teeth, due to the block having been checked by the brace-bar while the type-bar completed its forward movement having distended the spring which is connected to said block. The above described mechanism insures perfect engagement of the calculating-wheel pinions and racks and eliminates all danger of overthrow, at intervals between locking of the pinions by their feed-pawls 102, and the engagement or disengagement of the rack 117 and said pinions, the said feed-pawls being lifted at timed intervals by mechanism to be described hereinafter, in order that the registering or calculating-wheels may be actuated when their pinions are meshed with said racks carried by the type-bars.

To register an item after the keys have been depressed, the hand-crank, as previously stated, is pulled forward causing the type-bar 17 corresponding to the depressed keys to move rearwardly and thereby bring their respective racks under the calculating-wheel pinions in position to be engaged by said pinion. For example, the key marked A in Fig. 1, represents the figure 1 in its column, and if this key is depressed the type-bar will move two spaces being checked by the stop-dog 27ª. This movement will bring the first tooth of the rack 117 directly in line with and under the interdental space of the pinion. Owing to the fact that the reciprocative sash which carries the type-bars has a longer stroke than that of said type-bars, there is always an interval of time before the completion of a forward stroke of the hand-crank, in which to accomplish a quick down-stroke of the item-register mechanism frame, whereby the pinions of the calculating-wheels are meshed with the racks of the aforesaid type-bars. This is accomplished by a crank-arm 121 that is carried by the rock-shaft 11, the crank-arm being in link-connection with a cross-head 122, which cross-head carries a cam-block 122ª and is mounted in a runway 123 supported by the machine-base 2, as best illustrated in Figs. 1, 4 and 5 of the drawings.

A shaft 124 (see Figs. 1, 2 and 4) is mounted in bearings of the frame-standards 2, adjacent to the shanks of the T-shaped brackets 89 comprising members of the register-mechanism frame. Fast on this shaft 124 are a pair of arms 125, having their ends in pivotal connection with the ends of the shank-portions of brackets 89, there being an intermediate arm 126 secured to the said shaft, which arm extends over the cross-head 122 and is provided with a depending foot 127 having a roller for engagement with the cross-head cam-block. A stop-lug 128 also depends from the intermediate arm 126 and normally rests upon the runway 123, being held in position thereon by a coil-spring 129, which spring is connected to said intermediate arm and the base of the machine. Thus when the cam-block 122ª is moved forward by its connection with the rock-shaft 11, the said cam-block causes a lift of the intermediate arm 126 as it passes under its roller equipped foot 127 and a corresponding depression of the arms 125, which movement draws the pinions of the calculating wheels downward to be engaged by their racks 117. As previously stated in the example, the first tooth of the rack being directly under the calculating-wheel pinion, the two lower teeth of the same will straddle said tooth, and upon a return of the type-bar to its normal position, the said pinion will be revolved the space of one tooth thus registering the item. After the register-mechanism has been drawn down however, it must be simultaneously locked in this position and prior to the starting of the hand-crank on its return stroke the registration before mentioned is effected. The register locking is accomplished by means of a tumbler 130, as best shown in Figs. 1, 7 and 5 which tumbler is pivotally secured to the side of the runway, its free end being provided with a stud 131 extending therethrough for engagement with a stud 132 that projects from the side of the intermediate arm 126. As shown in Fig. 1, the tumbler stud is normally to one side of the stud 132 of the arm, the said tumbler stud 131 being held against the stud 132 by a spring-controlled dog 133, which dog impinges against the tumbler. When the intermediate arm 126 is therefore lifted it is evident that the tumbler will be free to move over against a stop-lug 134 that extends from the runway 123. This action will bring the tumbler-stud immediately under the stud 132 of the intermediate arm, and consequently when the cam-block 122ª is retracted from its position, under the foot of said intermediate arm, the stud 131 of the latter will rest upon the tumbler stud and thereby prevent the coil-spring 129 from exerting its pressure to lift the register-mechanism, which mechanism is thereby locked. The locking-mechanism just described is released at the instant of completion of the return-stroke of the hand-crank or as the sash-frame comes to rest, when items are to be registered and printed the said locking mechanism being released at the beginning of the return-stroke of the hand-crank when a total is printed. This release for a total is effected through a lever 135 fast on a rod 136, which rod extends through apertures in the frame-standards 2 constituting bearings therefor.

The end of the lever 135 is bifurcated for engagement with the tumbler stud 131, there being a horizontally disposed knock-off plate 136ª in swivel-connection with the rod 136 having arms extending in either direction and directly under the longitudinal bar 8 of the sash-frame, as best shown in Figs. 1, 4, and 5 of the drawings. The arms of the knock-off plate are held at right-angles to the rod 136 being held in position by a spring 137 in opposition to a pin carried by said rod, the spring being connected to the knock-off plate and boss of the lever 135. The arm of the knock-off plate extending toward the front of the machine has a beveled-face nose 138 for engagement with a tappet-finger 139 carried by the sash-frame bar 8, the tappet-finger being located upon the underside of said bar in such position as to be forward of the knock-off plate nose 138 and at a distance therefrom approximately equal to the length of travel of the sash frame, when said sash-frame is in its extreme forward position. An up-turned end of the tappet-finger 139 having an abrupt rear face and curved forward face is designed to engage the beveled-face nose of the knock-off plate and effect a release of the register-mechanism for a total or sub-total operation. The nose of the knock-off plate, in which case is moved into the path of the travel of the tappet-finger end, by mechanism in connection with a total or sub-total operation, the said nose of the knock-off plate being normally out of the path of travel of the aforesaid finger, as shown in Fig. 4. The rear or item-release arm of the knock-off plate is also provided with a projecting nose 140. This nose is extended in the opposite direction from that just described and terminates with an abrupt end face, being adapted for engagement with a tappet-finger 141 which is also carried by the sash-frame bar, and is in such relation to the before mentioned tappet-finger 139, that it normally rests directly over and forward of the knock-off plate nose 140, when the sash-frame is in its extreme forward position, as best indicated in Fig.

4 of the drawings. Thus it will be seen that owing to the relation of the lever 135 with the tumbler stud 131, when the latter has been swung over to effect a locking-operation of the register-mechanism, it will cause a depression of the beveled face nose 138 of the knock-off plate and a corresponding rise of its opposite nose 140. As the locking movement takes place at the extreme end of the rearward stroke of the sash-frame, when the machine is effecting an item registering and printing-operation, it is apparent that the tappet-finger 141 is clear of the knock-off plate at the time of such locking, and that the abrupt nose of said knock-off plate is elevated above the end of said tappet-plate. Now as the sash-frame is returned forward and just as it comes to rest, the tappet-finger 141 will strike nose 140 of the knock-off plate causing a rock of the lever 135, which lever in turn trips the tumbler stud 131 from under the stud 132 of the intermediate arm 126, and the parts again assume their relative normal positions as shown in Fig. 1. During the above described register-release movement, it should be understood that tappet-finger 139 performs no function in connection with the knock-off plate, this release mechanism being utilized only during a total or sub-total operation.

Referring back to the registering-mechanism, (see Figs. 28 to 32) the timed mechanism for effecting engagement and disengagement of the feed-pawls 102 and locking-pawl 93 with racks 117, consists of a pair of rocker-cams 142 loosely mounted upon the ends of spindle 90. These rocker-cams have cam-slots 143 at their upper extremities for engagement with the bail 103 and curved headed pendants 144 for engagement with pins 145, which pins project from the frame standards 2. The pendent heads 144 are held against the pins 145 by coil-springs 146 secured to the T-shaped brackets 89 and upper portions of said rocker-cams. The springs 146 incidentally pass over pins 147 that extend from catch-dogs 148 and serve to hold the latter in locked engagement with pins 149 carried by the bail-ends 103ª. These catch-dogs are pivotally mounted upon the brackets 89 and are provided with depending feet that rest upon the upper edge of the frame-standards 2. The feet of the catch-dogs thus positioned will cause said dogs to swing backward and release the bail ends at the instant the register-mechanism is depressed.

By referring especially to Figs. 29 and 30 of the drawings, it will be clearly understood that as the register-mechanism moves down for engagement with the rack-carrying type-bars, the bail 103 will be released from the catch-dogs, and the heads of the pendent portions of the rocker-cams 142 will leave the pins 145. Springs 146 are then free to act, drawing the cam-slots in the upper extensions of said rocker-cams forward so as to produce a lift of said bail 103. This lift of the bail simultaneously lifts all pawls from their meshed position with the pinions 92, just as said pinions seat in place to be engaged by the racks 117 of the type-bars. The rocker-cam movement as above described is effected in conjunction with the pins 145 carried by the frame standards, such movement of the rocker-cams in connection with the pins being attained only when an item is registered and printed. This is due to the fact that oscillatory guide-shoes 150 normally lie against the head of pendent portion of the rocker-cam directly under its operating pins 145, and are displaced by a rearward movement of the sash-frame. The position of the guide-shoes is controlled by an intermediate roller-carrying lever 151 fast on an arbor 152 that is mounted in bearings of the frame-standards, and to which arbor the said guide-shoes are also secured. The roller of lever 151 rests upon a depending shoe 153 of the sash-frame bar 7, when said sash-frame is at its normal or extreme forward position, and consequently as soon as the sash-frame is moved rearward for an item registration and printing-operation, the said lever 151 rises and is seated upon the sash-frame bar, being forced into this position by the spring-pressure of the rocker-cam which is exerted against the guide-shoe, the latter is thereby displaced as the heads of the rocker-cam pendants pass downward from their engagement with the pins 145. The guide-shoes and their connections are provided to control the tripping of the calculating-wheel feed-pawls and also locking-pawls 93 in connection with the engagement of the pinions of said wheels and their racks, in a total or sub-total operation to be hereinafter described.

The loading-bar 113 (see Figs. 1, 2, 4 and 6) of the register-mechanism is operated by a cam-wheel 154 fast on a cam-shaft 155, the shaft being journaled in bearings, one of which is formed in the right-hand frame-standard 1 and the opposite being in a chair 156 that extends from the base 2. The cam-shaft 155 also carries the cam-wheel 45, which cam-wheel acts in conjunction with the mechanism to lock and release the operating keys at predetermined times during a printing-operation, as hereinbefore described. The cam-wheel 154 has an abrupt drop in its face connecting the highest and lowest surfaces thereof. Starting from a distance approximately one-eighth of its circumference from the lowest point, the face of the cam-wheel gradually increases or rises for a distance approximating three-eighths of its circumference. It thereafter continues concentrically for about one-eighth of its circumference, at which point it is slightly depressed and continues to the starting point upon this same depressed circumferential plane. Loosely mounted upon a paper-feed shaft 157 is a lever 158 having a roller for engagement with the cam-wheel 154. The roller of lever 158 normally rests upon the lowest face of said cam-wheel at the point of connection with the highest face thereof, in which relative position the cam is at rest. A quadrant 159 also projects from one side of the cam-wheel 154, terminating with radially disposed end faces, the quadrant being formed in such relation to the cam-wheel surface that one of its radially disposed faces is adjacent to the abrupt drop of said cam-wheel, the quadrant face being extended around the aforesaid cam-wheel in the same direction as it travels, which direction is indicated by the arrow in Fig. 1. A finger 160 projects from the lever 158 and is adapted to rest upon the face of the quadrant when the cam-wheel is about to complete a revolution and thus prevent any movement of the lever at this time until the said cam-wheel has made a full turn.

Referring to the detail view, (see Fig. 35) the end of lever 158 is connected to a strap consisting of two sections 161, 161ª respectively, the opposite end of the strap being in pivotal connection with the depending operating shank 114 of the universal loading-bar 113, as shown in Fig. 1. The strap-sections are connected by screws fast in the section 161 and passing through slots 162 of the strap-section 161ª, which section carries a roller 163 adapted to be engaged by the quadrant 159 at the first eighth of a revolution made by the cam-wheel 154. Stud extensions of the strap-section 161 have attached thereto coil-springs 164, which springs are connected at the opposite ends to the strap-section 161ª. The cam-wheel 154 makes a half revolution simultaneously with a rearward movement of the sash-frame and at the end of this movement the pinions of the calculating-wheels are lowered ready to be actuated by their racks, the pawls of said pinions at this time being all lifted. Now if a carrying-operation has been made on a preceding registration of the machine, it is evident that the feed-pawls 102 which effected this carrying movement have receded from their carrying position together with the loading-bar. Hence said feed-pawls must be restored by the loading-bar, through its connection with the cam-wheel, which wheel during its first eighth of a revolution has no effect other than to bring the roller 163 of the strap-section 161ª into engagement with the face of the quadrant 159. The cam-wheel 154 now completes a half revolution causing lever 158 to move rearwardly due to the rise in the cam surface. The strap roller 163 in the meantime having been engaged by the quadrant resists the tendency of the lever 158 to act upon the loading-bar, said lever having simply distended the strap-sections 161 and 161ª in opposition to their coil-spring connections. At the moment the cam-wheel has completed its half revolution and the sash-frame is to be returned the roller 163 of strap-section 161 drops off the radial face of the quadrant, the drop being caused through contraction of the strap-sections due to the stored-power in the springs 164. This action imparts motion to the loading-bar through strap-section 161ª, whereby the feed-pawls 102 which have previously effected a carrying-operation are reset. As the cam continues its rotation about one-eighth of a revolution further, the roller of lever 158 drops into the slightly depressed plane of the cam-wheel, which causes the loading-bar 113 to recede sufficiently to permit the tripping-dogs 96 and latches thereof to operate as previously described, there being no further movement of the lever 158 until the cam-wheel has completed its revolution, at which time said lever is restored to its position of rest, as shown in Fig. 1.

In order to insure the slight recedence of the loading-bar necessary to permit clearance for tripping-movement effected by the latches and tripping-dogs 96, a delicate spring 165 may be provided for holding the lever 158 in contact with its cam-face, such a spring being shown in Fig. 1 of the drawings.

With each operation of the machine, the cam-shaft 154, as stated, is rotated a full revolution, rotary motion being transferred to said shaft from the rock-shaft 11 (see Figs. 1, 4, 6, and 34), by means of a reciprocative plate 166, which is provided with oppositely disposed spur-toothed racks 167, so spaced apart and arranged as to alternately engage a spur pinion 168, which pinion is fast on the end of the cam-shaft 155, as clearly illustrated in Figs. 1, 4, 6, and 34. The plate 166 is provided with a shank having a longitudinal slot 169 therein for engagement with the rock-shaft 11, there being a leg 170 depending from the plate, which leg is also slotted for the reception of a pin 170ª carried by a crank-arm 171 that is secured to said rock-shaft. Coil-springs 172 are connected to the crank-arm above and below the rock-shaft 11, the opposite ends of the springs being connected to ears of the body-portion of the plate exterior of the racks 167. Centrally disposed between the racks is a slot 173, which slot is longitudinally divided by a rail 174, to constitute a double track the ends of the rail being stopped at a distance from the ends of the slot, whereby a passage is formed therebetween. The end of the cam-shaft 155 carries a guide-pin 175 projecting therefrom and into the slot 173, the diameter of the guide-pin being such that it has sliding-fit between the slot edges and the intermediate rail 174. A pin 176 projects from the upper edge of the body-portion of the plate, whereby motion is imparted to the release-arm 86 of the tripper-plate 84, which tripper-plate as previously stated sets the printing mechanism in motion.

All of the parts being in their position of rest, as shown in Fig. 1, and should motion be imparted thereto, crank-arm 171 through its pin connection with the slotted end of the plate leg 170, will cause said plate to be drawn forward and impart rotation to the cam-shaft through the lower rack of the aforesaid plate being in mesh with the pinion 168. During this movement, the plate is guided upon the rock-shaft by its slotted shank portion and is held into mesh with the pinion by the guide-pin 175, which pin is engaged by the lower edge of the plate slot 173 and opposite face of the intermediate rail 174. Just prior to finish of the forward movement of the plate 166, its pin 176 engages the releasing arm 86 of the tripper-plate 84 and sets the printing-mechanism into operation. At the finish of the forward movement of the plate 166, the pin 170$^a$ of the crank-arm 171 reaches the end of the slot in the plate leg 170. A further slight movement of said crank-arm in the same direction causes said plate to swing downward assisted by the lower spring 172 which is now distended, the crank-arm during this shift movement being locked in connection with slot of the plate leg. The guide-pin 170$^a$ at the same time has reached the end of the slot 173 and rides up into position to enter between the upper portion of said slot and the rail, preparatory to a return or reverse movement of the plate, the upper rack of said plate being now in engagement with the pinion. When rock-shaft 11 is reversed to complete the operation started, it will be apparent that the plate in returning to its normal position will rotate the pinion 168 in the same direction as before stated, the driving-power being now applied to the upper face of said pinion. Thus the pinion and its shaft are given a complete rotation, by the vibratory motion of the rock-shaft, it being understood that at the end of the last stroke of the crank-arm, the plate 166 is acted upon to reverse its rack-engagement with the pinion in a similar manner to that described. The rotary movement just mentioned is intermittent or incidental to each operation, whereby the said cam-shaft 155 and its various cams are always moved in the same direction which materially simplifies the timed mechanism.

In order to prevent back-lash and to lock, the cam-shaft 155 at each revolution, we provide a oneway ratchet-wheel 177, as best indicated in Figs. 1 and 4 of the drawings. The ratchet-wheel is fast on the cam-shaft and is engaged by a spring-controlled detent 178, which detent is mounted upon the adjacent frame standard 2 and serves to lock said ratchet-wheel against a backward movement and incidentally prevents the return of the hand-crank to its normal position before the latter has completed its full forward movement. This result is due to the actuating-mechanism in connection with the hand-crank, which mechanism imparts motion to the cam-shaft 155, it being understood that the return of said hand-crank is accomplished through the stored spring-power previously mentioned, which power imparts the last half revolution to the cam-shaft pinion 168.

Referring especially to Figs. 4, 17, 18 and 20, the machine is provided with a supplementary multiplying or items indicator register, the object of which is to indicate the number of items registered and printed in said machine up to a predetermined maximum number, the indicator mechanism being thereafter automatically returned to zero. The indicator therefor compresses a pair of indicator dials 179 and 180 respectively, the dial 179 to the left being adapted to register units, while the dial 180 registers in tens of units, being operated by a transfer mechansm in connection with the units dial to be hereinafter described. Each dial is provided with a series of ten peripheral ratchet teeth, and a corresponding number of indicator characters upon its face, including a cipher and the digits from 1 to 9. The dials are spaced apart so as to have clearance between their respective ratchet-teeth and are mounted in bearing bosses of a cross-brace 181 secured to the edges of the standards just forward of the series of calculating-wheels comprising the total-register. Depending hubs 182 secured to the dials are fitted into the bearing bosses of the cross-brace 181, these hubs being provided with lower flange-extensions which overlap the bottom faces of cups 183, formed upon the underside of said cross-brace. The flanged extensions of the links 182 prevent endwise movement of the dials in their respective bearings. The cups constitute housings for flat helical springs 183$^a$, which springs have their inner terminals secured in kerfs of depending heads of the hubs, the outer terminals of the springs being fast in kerfs formed in the cup-walls. After each dial has been revolved nine-tenths of a revolution indicating nine units, upon the next one-ninth movement of the dials they are returned to zero position by the springs, which springs are wound, during a positive step-by-step movement imparted to the disks, by suitable feed-mechanism. Loosely mounted about the bearing bosses of cross-brace 181 are trip-fingers 184 arranged to be actuated by depending lugs 185 carried by the dials.

As shown in Figs. 17 and 4, the trip-fingers 184 are in their normal position of rest, which position is assumed by the same after each dial is returned to zero. The units dial 197 as illustrated in Fig. 17, is shown in the position assumed after being revolved nine-tenths of a revolution, and upon its next movement this dial would be returned to zero, due to engagement of its lug 185 with the head 186 of a slide-bar 187, which head in turn rocks the trip-finger 184 in the same direction as that taken by the units dial when the latter is registering, being indicated by the arrow in Fig. 17. Pivoted to an ear of the cross-brace 181 is a spring-controlled rocker-plate 188, being normally held against a shoulder of a guide-finger 189, upon which finger one end of the rocker-plate rests. The rocker-plate carries a pair of spring-controlled clutch-pawls 190 which are opposed by stop-pins 190$^a$, each clutch-pawl being adapted for engagement with the ratchet-teeth of the before mentioned dials 179 and 180, whereby the said dials are held in opposition to their controlling springs 183$^a$. Each clutch-pawl is formed with a V-shaped tooth 191 for engagement with the trip-fingers 184 of their respective dials, which movement takes place in connection with the units dial 179, when its tripper-finger is rocked by the slide-plate head 186 as previously mentioned. When the trip-finger 184 of the tens-dial 180 however is actuated, it is moved directly by the tens-dial lug 185, in place of the finger being moved by the interposed head 186 of the slide-bar, as is the case with the units-dial. In either case this movement of the trip-fingers is designed to lift the clutch-pawls 190 from engagement with the dial ratchet-teeth, after said dials have made a complete revolution regardless of their position with relation to each other. When a trip-finger strikes the V-shaped tooth, it lifts the clutch-pawl from engagement with a ratchet-tooth of its dial, said finger then passes over the tooth and coming to rest upon the opposite side of said tooth against a stop-pin 192, in which position said tripper-finger is held by the spring-pressure of the clutch-pawl exerting force upon the end of the trip-finger, the latter having crossed the line of force that intersects its axis. The trip-finger 184 of the tens-dial 180 is checked on its rearward or reverse movement by a pin 193, while as before stated the trip-finger of the units dial 179 is checked by the head 186 of the slide-plate. From the foregoing it will be understood that after each complete revolution of the dials their respective trip-fingers will cause a release of the clutch-pawls from the ratchet-teeth of the dials and thus permit their springs to return said dials to zero, the trip-fingers and clutch-pawls being restored to their normal position, as shown in Fig. 4, by the lugs 185 of the dials striking said trip-fingers upon their reverse sides with sufficient momentum to dislodge them from the clutch-pawls, the said lugs 185 in this instance serving as stops to aline the zero characters of the aforesaid dials in position the zero characters will show through an aperture in the casing of the machine.

Feed is imparted to the tens-dial 180 by means of a push-pawl 194 carried by the slide-plate 187, there being a coil-spring in connection with the push-pawl and cross-brace 181, which serves to hold said push-pawl in position against a pin 195 of said slide-plate, thus the spring-pressure is exerted also to hold the aforesaid slide-plate back against a stop-pin 196 when the parts are at rest, the spring thereby also returns the nose of the aforesaid push-pawl clear of the ratchet-teeth of the tens-dial after each forward stroke of the push-pawl. Hence when the parts are in the position shown in Fig. 17 of the drawings, and the units-dial is moved one space forward, it will be seen that a transfer or carrying-operation will take place due to the fact that lug 185 of the units-dial will move the slide-plate forward and cause its push-pawl to impart motion to the tens-dial.

Feed is imparted to the units-dial through engagement of a spring-controlled push-pawl 197 with the ratchet-teeth of said units dial, the push-pawl being mounted upon one end of a lever 198, which lever is pivotally supported upon the cross-brace 181, and is oscillated with each item-registering and printing-operation of the machine, to cause the dial to be rotated one tooth and thus indicate the registration of an item. From the foregoing it will be seen that items up to nine may be registered upon the units-dial, the tenth item being transferred to the tens-dial and so on, to ninety-nine items, at which time both dials are simultaneously returned to zero, the tens-dial being released by the feeding-movement of the slide-plate, its feed-pawl causing rotation of said tens-dial and engagement of its lug 185 with the trip-finger. The lever 198 which controls item-registration of the indicator is connected to one end of a spring-controlled link 199, as best shown in Figs. 2, 4, and 23 of the drawings, the opposite end of the link being slotted for the reception of a stud 200 which extends therethrough. This stud projects from one end of a lever 201 pivotally secured to the right-hand frame-standard 2, the said stud passes through the link-slot and serves as a bearing for a spring-controlled dog 202 that is arranged to engage a spur-extension 203 of said link. The lower end of the lever 201 is linked to an arm 204 secured to the power-shaft 12, the arm being provided with a pin 205, the rear side of which pin is engaged by a nose 206 that projects from a hub of the hand-crank 14, the hub of the hand-crank being loosely mounted on said power-shaft. Thus when the hand-crank is moved forward to effect an item-registering and printing-operation, it will cause the power-shaft to rotate in the same direction due to the hand-crank hub nose 206 being engaged by the pin of arm 204, the arm in turn, through its connection, will cause the dog 202 to engage the spur 203 of link 199, imparting motion thereto to effect a registration of the item upon the indicator just at the finish of the forward stroke of the hand-crank. In order to prevent the indicator from making a registration of an item, should the hand-crank be operated for any purpose when no keys are depressed, the following mechanism is provided: The key-board mechanism carries a spring-controlled plunger-bar 207, as clearly illustrated in Figs. 2, 5, 23, and 25. The plunger-bar 207 is mounted upon and secured to the upper face of the key-board casing 29$^a$ and extends across the same, being provided with a series of depending feet 208 each adapted to be engaged by the corresponding bail 28$^a$ directly thereunder. The projecting end of the plunger-bar to the right carries a depending leg 209, which leg extends in the path of rearward travel of the tail-end of the dog 202, the said leg being provided with a notch 210, which notch normally lies just to the left of the tail-end of said dog. When a key is depressed, its bail 28$^a$ acts and by engaging the depending foot 208 of the plunger-bar, the latter will be moved to the right a sufficient distance to cause the notch 210 of the plunger-bar leg to come in alinement with the tail-end of the dog 202. Thus the tail-end of said dog will be free to pass through the notch when the machine is operated and effect a registration of an item upon the indicator, the plunger-bar being thereafter returned to its position of rest. Upon the other hand, if the leg of the plunger-bar is in its normal position of rest, it will be seen that the tail-end of the dog when moved rearward will engage the leg and thereby lift the engaging-end of said dog, so as to clear the spur 203 and thus an operation of the indicator is avoided. This plunger-bar is also actuated to disconnect the indicator feed-mechanism in a total, and eliminating operation to be hereinafter described.

The indicator being designed for only indicating the number of items registered and recorded, it follows that the same must be cleared or restored to zero after a total-operation of the machine and hence the provision of the spring-controlled rocker-plate 188, which plate is actuated by mechanism in connection with the total-mechanism of the machine to cause disengagement of the clutch-pawls 190 with the toothed edges of the dials to permit the same to return to zero regardless of the number of items they may indicate at the time.

The hand-crank 14 or operating-lever of the machine is moved forward and backward to its normal position to accomplish an item-registration and recording operation, and to accomplish a total or sub-total operation, this hand-crank is first moved rearward of its normal position, being thereafter moved forward and backward as in the case of an item registering and recording operation. This rearward movement of the hand-crank from its normal position is primarily for the purpose of drawing the register-mechanism down or setting the same so that its calculating-wheel pinions will be in position to mesh with the racks of the type-bars, prior to a movement of the latter. Thus for obtaining a total or sub-total, the register is set before the type-bars 17 are moved, while for an item-operation said total-register is set after the said type-bars have been moved. The total or sub-total set of the register is accomplished through a finger 211 that is fast upon one end of the shaft 124 exterior of the right-hand standard of the machine, as best shown in Fig. 2. The end of finger 211 rests upon a lug-extension 212 of the hand-crank hub, when said hand-crank is in its normal position of rest. Hence when the hand-crank is moved rearward from its normal position for a total or sub-total, the lug-extension of its hub lifts upon the finger 211, causing shaft 124 to rock and set the register direct, in a similar manner to that previously described in connection with the intermediate arm 126 and cross-head 122, the said intermediate arm being locked by its stud 132 in connection with the stud 131 of the tumbler. In the case of a total operation, the locking-mechanism, which holds the register set must be released at the beginning of the rearward or return-stroke of the hand-crank, and just before the type-bars have started upon their forward movement in order to avoid actuating said register now at zero. This, as best shown in Fig. 2, is accomplished through mechanism as follows: A cross-shaft 213, mounted in bearings of the frame-standards, carries an arm 214, which arm is connected to the nose 206 of the hand-crank hub by a strap 215, the strap being slotted at its connection with the arm whereby there is no motion imparted to the latter when the hand-crank is moved forward from its normal position. A coil-spring 216 connects an extension of the strap 215 with the before mentioned arm 204 carried by the power-shaft, and thus when the hand-crank is at rest, this coil-spring acts to hold the nose 206 of the latter against the pin 205 of said arm 204, whereby the crank-handle is opposed by said spring and prevented from dropping rearward through momentum or gravity.

As seen in Figs. 3 and 33, the cross-shaft 213 at this side of the machine has secured thereto an arm 217, to the end of which arm is connected a slidable strap 218 having a cam-face end 218$^a$, that is slotted to constitute a guide in connection with a pin carried by the left-hand standard 2. The cam-faced end 218$^a$ of the strap is arranged to engage and impart longitudinal movement to the rod 136, which rod carries the release lever 135 of the register-releasing mechanism before mentioned. From the foregoing it is apparent that the crank-handle being moved rearward to effect a total or sub-total, movement will be imparted to the cross-shaft through its connections and the cam-faced end 218$^a$ of the strap will thereby force the rod 136 to the right in opposition to a coil-spring 219, which spring is fast to said rod and the left-hand frame standard. This movement of the rod 136 retracts the nose 140 of the knock-off plate 136$^a$ from its engaging position with the tappet-finger 141, and at the same time places the beveled face nose 138 of said knock-off plate in position to be engaged by the tappet-finger 139, when the sash-frame carrying said tappet-finger is moved rearward its full stroke. The upturned nose of the tappet finger 139 in which case will strike the beveled face nose 138 causing the knock-off plate 136$^a$ to swing back upon its axis and allow the nose of said tappet-finger 139 to pass rearwardly of the nose 138. Thus the tappet-finger 139 is now positioned to rock the lever 135 and thereby cause release of the register as the sash-frame starts forward to complete the total-operation. The said tappet-finger 130 has thus assumed its tripping-position on the rearward movement of the sash-frame without disturbing the release-mechanism of the register. When the strap 218 is moved to set the register-releasing mechanism for a total or sub-total, the said strap together with its connected arm 217 are locked in their set position, by means of the notched end of an arm 220 of a spring-controlled double bell-crank, as clearly shown in Figs. 3 and 33, the notched end of the bell-crank arm being arranged to drop back over a spur 221 of the arm 217.

To release all keys that may be depressed and thereby clear the machine before recording a total or sub-total taken from the register, the universal key-release bar 36 must be actuated. This is accomplished through the bell-crank 37$^a$ that is attached to the universal release-bar 36, one arm of the bell-crank 37$^a$ being actuated by the heel of a trip-lever 222, which trip-lever is pivotally mounted upon the key-board casing 29$^a$. A dog 223 is mounted upon the end of the trip-lever being provided with a double-stepped recess 224 at its end for engagement with a stub 225 that projects from the arm 217. Thus when the said arm 217 and strap 218 are moved forward to set the register release-mechanism for a total or sub-total, all depressed keys are released owing to the movement of the universal bar 30 in connection with the bell-crank 37$^a$, said movement being due to the heel of the trip-lever 222, which lever is actuated by the pull exerted upon the dog 223 due to its connection with the arm 217. This release of the keys by rearward movement of the hand-crank is also utilized for "clearing" the machine prior to pulling said hand-crank forward and allowing the same to return to its normal position, in which case the "clear" sign will be printed, thus .00. The movement of the arm 220 of the double bell-crank which locks the arm 217, is also transmitted to a cut-off plate 226 through a vertically disposed arm 227 of the double bell-crank, which arm is linked to a bell-crank 228 mounted upon the underside of a key-board casing 29$^a$. This bell-crank 228, as shown in Figs. 4 and 24 is connected to the cut-off plate 226, which plate is slidably secured to the bottom wall of the key-board casing and arranged, when actuated as aforesaid, to cover the ends of the key-shanks and prevent the same from being depressed. The third arm 229 of the double bell-crank is in wrist-pin connection with a slot in the end of a link 230, which link in turn is hung upon one end of a rocker-arm 231 fast on the shaft 48, which shaft at its opposite end carries the lever 47 that is utilized in connection with the key-releasing mechanism previously described. When the double bell-crank is in its normal position, as shown in the drawings, the wrist-pin of its third arm 229 is midway of the slot in the link 230, and hence when the said double bell-crank is moved by its spring exerting pressure, its arm 220 drops into locking engagement with the spur 221 of arm 217. It will now be seen that the wrist-pin has passed upward and contacts with the upper end of the slot, so that a downward movement of the link 230 would cause the arm 217 to be released by the double bell-crank.

If all calculating wheels of the series are at zero, the toothed extensions 95 of their metallic disks would be alined and in the position, as shown in Figs. 1, 27, 28, and 29. This alinement is accomplished through a total or sub-total operation by means of a spring-controlled universal total-bar 232, which bar is fulcrumed to the side-rod 87 of the register-frame and provided with a depending tail 233 exterior of the left-hand frame-standard 2. The spring-pressure upon the total-bar 232 tends to hold the latter normally clear of the toothed extensions 95 of the calculating-wheels, the tail 233 of said total-bar being forced against the forward edge of the arm 217, by which arm the aforesaid total-bar is depressed into the path of travel of said lug-extensions. Now assuming that the first three calculating-wheels of the item-register from right to left show as the sum-total of the number of items registered and recorded 320. This footing would indicate that the first calculating-wheel was in its normal or zero position relative to the total-bar 232. The engaging-face of the tooth-extension 95 of this calculating-wheel would consequently be so disposed that the total-bar if depressed, would just clear said engaging-face of the tooth-extension 95. The tooth-extension 95 of the second calculating-wheel of higher order would be two spaces to the rear of the total-bar, and the third calculating-wheel tooth-extension three spaces from said bar. The register being now set for a total, as previously described, the total-bar 232 is depressed. The next movement of the operating mechanism will cause the sash-frame and type-bars to slide rearwardly as in the case of an item-registration and recording operation. The first type-bar from right to left will consequently travel with the sash-frame until the rear tooth of its rack 117 engages the adjacent tooth of the first calculating-wheel. As this wheel stands at zero it is locked against rotation by the total-bar 232, and it follows from the previous description that the rack 117 and its type-bar will therefore be stopped without affecting the calculating-wheel, having made a rearward movement of only one space, which movement will present the cipher-type to the printing-line. The next type-bar will move one space, engage the pinion of its corresponding calculating-wheel, and thereafter the said type-bar together with the pinion of the calculating-wheel will move two spaces, its tooth-extension 95 being now against the total-bar, the said calculating-wheel will be checked in its rotation together with the type-bar from further rearward movement. The cipher character upon this calculating-wheel is thereby alined with the cipher-character of the first calculating-wheel, and the type-bar bearing the character "2" will now be brought to the printing-line. The last or third calculating-wheel is operated in a similar manner, except that it moves three spaces, its type-bar carrying the corresponding type character to the printing-line. The total amount 320 is thereafter printed in a similar manner to that mentioned in connection with the printing operation of an item, it being borne in mind that the calculating-wheel feed-pawls 102 are lifted prior to movement of the type-bars, and that the universal loading-bar 113 resets all feed-pawls during the succeeding operation.

Just before the register is released from its engagement with the racks of the type-bars, (see Fig. 1) it will be seen that the dogs 22 are lifted into engagement with the notched heads 21 of said type-bars by the contact tails 23, which tails are actuated by the cross-rail 6 of the sash-frame. Thus the dogs each hold their bars in opposition to their springs 25 at the instant of disengagement of the calculating-wheel pinions from the register, provided said type-bars have not moved more than one space, which is the distance they travel, to bring their cipher type to the printing-line. The object of holding the bars as above described is to prevent the same from a possible idle rearward movement, due to lost-motion of the mechanism, which lost-motion might delay action of the bail-fingers 30ª, whereby the type-bars would not be stopped by said fingers in the manner herein before mentioned in connection with item-registering and recording mechanism.

Referring particularly to Fig. 3, of the drawings, just before the type-bars complete their forward movement in effecting a total or sub-total operation, a pin 234 carried by the pitman 9 at the left-hand side of the machine, will engage the end of the dog 223, causing the first step of its double-stepped recess 224 to lift from engagement with the stud 225 of arm 217. The trip-lever 222 being thus freed will permit the universal release bar 36 to retract from engagement with the series of bails 28ª, bell-crank 37 to the right end of the latter being rocked until its free arm contacts with the lever 47, by which lever the said bell-crank 37 is actuated. The instantaneous release of the dog 223 by the pin 234 however only frees said dog from engagement with the stud 225 temporarily in order to accomplish the release of the universal bar 36, the dog, by gravity, being adapted to reëngage said stud in the second step of the double-stepped recess 224.

All of the parts being in the position as described and the sash-frame having completed its rearward movement, the return-stroke thereof first trips the register-mechanism from its set, the type-bars are then returned to rest and as the cam-wheel 45 finishes its revolution, the key-release lever 54 in connection with the dog 57 imparts a slight rock to the lever 47, the shaft 48 of which lever, through its connection as shown in Fig. 33, will thereby rock the double bell-crank and release its arm 220 from its locked position with relation to arm 217. Thus all of the mechanism is restored to its normal position of rest. Referring to Figs. 2 and 5 of the drawings, the arm 204 that is fast on the power-shaft is provided with a block 235 arranged to be engaged by the end of a locking-bar 236, which locking-bar is pivoted to the standard 2 and connected to the lever 47 by a link 237. By this mechanism should a manual release of depressed keys be made and the release-and-repeat key held forward, the block 235 would lock the power-shaft and prevent forward movement of same from its normal position. When the release-and-repeat key is set for a repeating operation, the thrust-bar 49 is arranged to engage and rock a spring-controlled total locking-lever 238, the same being pivoted to the frame standard and provided with a foot at its lower end. A strap 239 is connected to the locking-lever 238 and extends rearward, its end being forked and guided upon the cam-shaft 155. A roller 240 carried by the strap 239 is designed to normally rest in a pocket 241 of an annular face of the cam-wheel 45, when said cam-wheel is at normal position. The locking-lever 238 is moved by the cam-wheel pocket 240 upon an initial start of said cam-wheel, this places the foot of said locking-lever 238 directly under an adjacent face of the nose 206 of the hand-crank hub and thereby prevents said hand-crank from being moved rearwardly for a total or sub-total operation, subsequent to a slight forward movement of the aforesaid hand-crank. The foot of the locking-lever 238 is consequently held in the aforesaid position by the annular face of the cam-wheel during its entire revolution or until released by the strap roller 240 dropping into the pocket 241 of said annular cam face. The same locking effect is produced by the locking-lever 238, when said locking-lever is moved by the release-and-repeat key through bar 49 as previously stated.

As hereinbefore described the spring-controlled rocker-plate 188 is provided for releasing the indicator-dials simultaneously, whereby they are returned to zero in a total operation. With this object in view a spring-controlled latch 242 is pivoted to the upper end of arm 217, the latch being provided with a rearwardly extending tail 243 and a forward clutch-head, which head normally rests over one end of a lever 244 provided with guides for the latch-head. The lever 244 is pivoted upon the cross-brace 181 being connected by a link at its inner end to the rocker-plate 188 of the indicator. The extreme adjacent end of the rocker-plate 188 is tapered to a pin, (as best shown in Figs. 4, 17 and 20) upon which pin rests the head of a tumbler 245, its shank being pivoted to the lower face of the cross-bar. The head of the tumbler has a nose depending in the path of the travel of the spacing-comb 18 of the sash-frame cross-rod 6, said head being also provided with a notch 246 just forward of the position assumed by the pin-portion of the rocker-plate 188 when the same is at rest. A lug 247 extends from the pitman 9 and serves as a rest for the forward or head end of the latch 242, the latter being provided with a depending foot 248, which foot normally rests upon the lug 247 when the parts are at rest as shown in Fig. 3.

When the rearward movement of the hand-crank takes place for a total, this latch 242 is forced forward (see Figs. 3, 4 and 20), its foot 248 having passed the lug 247, the clutch-head portion of said latch will drop over and engage the lever 244. The instant the spring-controlled arm 217 is released at the return of the sash-frame to its normal position, it will be seen that the latch in moving rearward will also pull said lever 244, which lever owing to its connection with the rocker-plate 188 releases the clutch-dogs 190 of the indicator, permitting the dials thereof to return to zero. As the latch travels rearwardly carrying the lever 244, it is tripped therefrom by the pitman lug 247 coming in contact with the depending foot 248 of said latch. In the meantime the notch 246 of the tumbler 245 has engaged the pin end of the rocker-plate 188 and thus holds the same so as to provide ample time for the dials to revolve before the clutch-dogs are returned, which return is accomplished at the start of the next operation of the machine by means of the spacing comb 18 of the sash-frame striking the depending nose of said tumbler and lifting the latter so that its notch 246 will permit return of the rocker-plate 188 to its normal position. The latch 242 being now at rest upon the lug 247 of the pitman 9, there is sufficient clearance between the lower face of the latch clutch-head and lever 244 to permit the same to slide under the latch-head. A spring-controlled sub-total key 249 is mounted upon a stud 250 fast to the left-hand side wall of the key-board casing 29$^a$. The end of the sub-total key has pivoted thereto a spring-controlled catch-dog 251, which is held against a stop-in 251$^a$, the dog being arranged to have locking-engagement with a pin 252 carried by the strap 218 that effects longitudinal movement of the rod 136. A sub-total release-plate 253 is pivoted to the vertically disposed arm 227 of the double bell-crank, the release-plate being in link-connection with the sub-total key and is provided with a projecting nose 254, which nose is normally disposed above the path of travel of a pin 255 carried by the adjacent pitman 9 of the sash-frame mechanism. The end of the catch-dog 251 is normally just over and alined with the tail 243 of the latch 242, which latch acts to clear the multiplying item-indicator register as before mentioned. A sub-total operation is in all respects similar to that of a total-operation, except that in obtaining a sub-total, the pinions of the register calculating-wheels are held down both during the rearward and forward stroke of the type-bars and thus a footing or total amount of the items shown upon the wheels at this time will remain the same, being recorded by a printing-operation. The calculating-wheels on the rearward stroke of the type-bars are brought to zero and are stopped by the total-bar 232, upon the return stroke of the type-bars, said wheels are revolved in a reverse direction and brought back to their same relative positions, showing the footing that was indicated by their characters previous to the sub-total operation. Hence in printing a sub-total, the hand-crank is pressed rearward and all parts resume the same relative position as in case of a total-operation. The sub-total key is then depressed, pin 252 of strap 218 being now against the catch-dog 251, the latter will engage said pin and thereby hold the sub-total key in its depressed position. The end of the catch-dog 251 has also depressed the tail 243 of latch 242, and the said latch is thus lifted from its tripped position with relation to the indicator mechanism and the nose 254, of the release-plate 253 has dropped in position to be struck by the pin 255 of the pitman 9. As the pitman 9 of the sash-frame finishes its rearward stroke the pin 255 thereof strikes the nose 254 of the release-plate 253 and thus said release-plate rocks the double bell-crank with the same results as previously mentioned in connection with a total-operation, the register being thereby held in its set position during the entire operation but the indicator is not returned to zero or cleared.

Referring to Figs. 1, 9, 10, 6 and 8 of the drawings, a tri-colored ribbon 256 is mounted upon spools 257 and arranged to pass over a plate 258 and intermediate guide-rollers carried thereby, the plate being apertured at the printing-line of the machine and secured to the brackets 71 directly over the type. Both of the spools 257 and the guide-rollers of the ribbon are longitudinally movable, the said spools being splined upon arbors 257ª and 257ᵇ, that are hung in bearings carried by the opposite frame standards. The ribbon-spools 257 are engaged by spanners extending from straps 259, 260, respectively, the rear ends of the straps being slotted and supported by studs carried by the standards 2. The opposite or forward ends of the straps are connected to arms 261 and 262 respectively, which arms are secured to the ends of the ribbon-shift shaft 55, as best shown in Figs. 2 and 3 of the drawings. Arm 262 extends in either direction from its shaft 55, the lower end of which arm is in spring-connection with the adjacent left-hand standard 2 and is also linked to a lever 263, the latter being loosely mounted upon a hub of the arm 217 at the forward end of the machine. This lever has an upwardly extending finger 264 which overlaps and engages the forward edge of the arm 217.

By referring especially to Figs. 1 and 8 of the drawings, it will be seen that when the tri-colored ribbon 256 is in its normal position with relation to the printing-point, indicated by $x$, the first color will be used, which color indicates items registered, the next color to the rear indicates and is utilized for recording items eliminated from the register, and the third or last color for totals or sub-totals. Thus when the machine is recording registered items, there is no transverse adjustment of the ribbon. When a total or sub-total is recorded however, it will be understood from the foregoing that the ribbon will be shifted forward to bring its central color to the printing-line. This is accomplished by the forward movement of arm 217, which arm through its connection with the finger 264 of lever 263 causes the ribbon-spools to shift upon their arbors in a forward direction, by means of the spanner-engagement of the straps 259 and 260 therewith, the spools being held in this position until released by the action of arm 217 at which time the spring in connection with arm 262 restores the parts to their normal position of rest. As best shown in Figs. 6, 8, and 9, when the above described ribbon movement takes place, a projecting end 265 of strap 259 engages and actuates a lever 266 that is mounted upon one of the standards 2. This lever 266 in turn operates a spring-controlled lever 267, which lever is disposed at a right-angle thereto and is pivoted upon a stud carried by the machine cross-brace 72. The free end of this lever is normally disposed over the finger-extensions 79 of the first and second hammer locking levers 78, and when said finger-extensions are depressed by the above mentioned mechanism, they will also cause the hammers controlled by same to be returned, whereby the unit and the ten ciphers of the corresponding type-bars are printed. Thus these ciphers may be printed as a clear sign in connection with a total operation.

For printing eliminated items, the ribbon is shifted in the same manner as described in connection with a total or sub-total operation, with the exception that it is drawn farther forward to a third transverse position with relation to the printing-point by means of an item-eliminating key 268, which key is forced downward against a branch 269 of the arm 262. In this case it will be observed that the finger 264 of lever 263 moves idly away from the arm 217, which arm in the previous described operation imparted motion to the ribbon-shift mechanism. Feed is imparted to the ribbon through ratchet-wheels 270 and 270$^a$ fast on the ribbon spool-arbors 257$^a$ and 257$^b$, as best shown in Figs. 6, 8, 9 and 11, the ratchet-wheels being driven by spring-controlled pawls 271 and 271$^a$ respectively, which pawls are pivoted to a shift-plate 272, the shift-plate being adjustably connected to a thrust-bar 273 that is guided in apertures of the right and left hand standards 2. A stop-pin of the thrust-bar is normally held by a spring 274 against the inner face of the right-hand standard, the protruding end of said bar being beveled for engagement with one arm of a bell-crank lever 275, which lever is connected by a strap 276 to the arm 10 of pitman 9 at the right-hand side of the machine. Thus it will be seen that at the finish of each operation of the machine the (the feed being in the position shown in Fig. 6) pawl 271 will act to impart a slight motion to its ratchet-wheel 270, through the spring 274, the thrust-bar 273 having first been positively moved longitudinally by the bell-crank lever 275. Each spool is provided with a gage-finger 277, which finger is designed to rest upon the roll of ribbon upon its respective spools, the gage-fingers 277 being held thereon, by gravity, each secured to a shaft 278, which shafts are hung in the bearing-ears that support the ribbon-arbors 257$^a$ and 257$^b$. The ends of the shafts 278, adjacent to the thrust-bar, carry dogs 279, 279$^a$, having elongated apertured ends for engagement with pins 280, 280$^a$, carried by the depending ends of the shift-plate. By this construction it is apparent that when pawl 271 has approximately unwound the ribbon from that spool which is actuated by the pawl 271$^a$, the dog 279$^a$ of this latter spool will drop, by gravity, in the path of travel of the adjacent pin 280$^a$ of the shift-plate. The next positive feed-movement of the thrust-bar 273 will cause said pin 280$^a$ to ride under said dog 279$^a$, and as spring 274 retracts said thrust-bar, the shift-plate 272 is held by the aforesaid pin, thus the thrust-bar moves independently. A spring-controlled locking-dog 281, that is fulcrumed to the thrust-bar, will now slip from one of two notches 282 in the shift-plate, with which the locking-dog is in engagement, to the next notch and thus lock said shift-plate so that upon the next positive feed-movement of said thrust-bar, pawl 271$^a$ will be in position to feed the ribbon in a reverse direction, which feed is now effected at the start of the machine or before a printing-operation. By utilizing the dogs 279, 279$^a$ in connection with the shift-plate, all strain is taken from the ribbon in a shift-operation of the feed, it being understood that the locking-dog 281 exerts sufficient pressure upon the shift-plate to hold the same in its feeding position, except when said shift-plate is absolutely held by one of the dogs 279, 279$^a$.

A longitudinally movable paper-carriage 282, as clearly shown in Figs. 1, 3 and 6 is mounted in front and rear guide-rails 283, 283$^a$, which rails constitute a portion of a carriage-supporting frame that is secured to the upper portion of the machine standards 2. The carriage 282 supports the usual platen-roller 284 above the printing-line, the platen-roller being lifted from the printing-line by suitable end brackets 285, which brackets are connected to a rod 286, that in turn is carried by supporting plates 287 fulcrumed to ears of said carriage. Paper clamping-rollers 288 and 289 are mounted upon the ends of suitable links 290, which links are hung upon rods 291 carried by the end-brackets 285 and are connected by springs 292, whereby the rollers are held firmly in contact with paper that is wound under the platen to receive the printed record. A hand-release lever 293 is connected with the links 290 of the clamping-rollers by means of a strap 294, whereby the said rollers may be retracted from their normal engagement with the platen for the purpose of inserting the paper thereon.

As shown in Fig. 7, a roll of paper in this instance is designed to be mounted upon a spindle 295 supported by standards 296, which standards are in hinge-connection with a longitudinal angle-plate 297 that is pivoted to the carriage ends, being held against the rear side-rail of said carriage by a coil-spring 298 fastened to the aforesaid carriage and angle-plate.

In place of the paper-carriage and attaching mechanism described, we may substitute therefor any form of paper-carriage suitable for the purpose of having longitudinal adjustment with relation to a printing-point whereby two or more columns of figures may be placed side by side if desired.

As best shown in Figs. 1, 2 and 22 feed of the paper with each operation of the machine is accomplished by a series of feed-rollers 298, which rollers are fast upon a shaft 299, that has its bearings in spring-controlled cranked hangers 300, the cranked hangers being pivotally connected to the side-bar of the carriage-supporting frame. Arms of the cranked hangers have vertically disposed links 301 secured thereto, lower forked ends of which links straddle a shaft 302 that is revoluble in bearing ears extending rearward from the standards. The spring-controlled cranked hangers 300 normally hold the feed-rollers 298 clear of the paper-clamping roller 289, through which roller feed is imparted to the platen by said feed-rollers 298, whereby line-spacing of the paper is obtained. The feed-rollers are intermittently moved into engagement with the said clamping-rollers 289 to produce a feed of the paper after each printing-operation of a registered item, total or sub-total.

The timing and motion of the paper-feed mechanism is obtained by means of a pair of cam-wheels 303 fast on the ends of the shaft 302, the cam-wheels being of such contour as to lift the links 301 after each alternate one-quarter revolution thereof. The lift is effected through rollers carried by each of said links in engagement with the aforesaid cam-wheels. Rotation of the feed-rollers 298 is had through a clutch-member 304 that is fast on the feed-roller shaft 299 at the left-hand side of the machine. This clutch-member is engaged by a spring-controlled clutch-plate 305 having staggered pins for gripping the inner and outer faces of the clutch-member 304. When the clutch-plate is operated in one direction, the pins are fed from the clutch-member faces, and when the motion is reversed said pins grip and cause a feed movement of said clutch-member. A disk 205ª that is loosely mounted upon the end of the shaft 299 serves to hold the clutch-plate 304 in position, as best shown in Figs. 21 and 22 of the drawings. A link 306 is connected to the clutch-plate 305 and a spring-controlled rocker-plate 307, which plate is pivoted to the adjacent side standard 2, and is provided with a pin 308 for engagement with a notched end-face 309 of a dog that is pivotally mounted upon a double lever 310. The double lever is centrally secured to the paper-feed shaft 157, which shaft receives its motion through said double lever 310, being in link-connection with one of the arms 10 that are actuated by the pitmen 9, as best shown in Fig. 3. Rearward motion being imparted to the pitmen and their connected arms 10, will thus impart motion to the double lever 310, causing the face 309 of the dog to move the rocker-plate 307 in opposition to its spring-control. The clutch-plate 305 will also move, but has only a slipping action in connection with the rim of the clutch-member 304. Now when the parts are returning to their normal position of rest, it will be understood that the spring-controlled rocker-plate 307 will cause the clutch-plate 305 that is connected thereto to rotate the shaft and its series of feed-rollers 298 in the direction indicated by the arrow in Fig. 3, which movement feeds the paper, the cam-wheel 303 having in the meantime held said feed-rollers in engagement with the clamping roller 289. The limit of the feed-stroke of the paper is controlled by a slidable stop-plate 312 that is mounted upon the adjacent side-bar of the carriage-supporting frame, there being a foot projecting from the stop-plate 312 adapted to be engaged by the link 306. Thus it is apparent that while the link 306 has a full rearward stroke, its forward or feed-stroke is timed by the position of the foot of stop-plate 312 with relation to the end of said link 306. A threaded spindle 313 is revolubly mounted in the front guide-rail 383 of the carriage-supporting frame, being in screw-thread engagement with a head of the stop-plate 312, whereby said stop-plate may be adjusted to any degree, in order to control the paper-feed so as to obtain any space desired between lines of printed items recorded upon the paper. By providing means for holding the paper-feed rollers 298 out of engagement with the clamping-roller 289, the paper-carriage is rendered free to move in either direction except during the interval of feeding. The timing of this feeding movement is accomplished through the cam-wheels 303, (see Figs. 3, 7 and 38) the latter being rotated a half revolution with each complete revolution of the cam-shaft 155. This cam-shaft 155 carries a gear-wheel 314 that transmits motion to the shaft 302, through its meshed-engagement with another gear-wheel 315 fast on the shaft 302, the latter gear-wheel being half the diameter of the first named gear-wheel 314.

In order to cushion all springs upon the return-stroke of the hand-crank of the machine, we have provided a dash-pot 316, the piston of which is in crank-connection with the shaft 157, and thus with each forward stroke of the hand-crank the dash-pot piston is forced downward, while rising upon the return-stroke of the hand-crank to ease any sudden jerk that might be caused by the action of the springs.

The eliminating mechanism contemplates, first, means whereby, upon the manual depression of the eliminating key 268, an item may be printed but not registered, either in line with a printed column of registered items or to one side thereof, in which latter case the paper-feed mechanism is thrown out of gear and a manual shifting of the paper-carriage is resorted to, the eliminating mechanism being thereafter returned to its normal position and automatically disconnected from the operating-mechanism of the machine; second, to provide means in connection with the eliminating key, whereby eliminated items may be automatically printed alternately with registered items in the same column, the paper being fed with each eliminated and registered item printing-operation; third, to provide means in connection with the eliminating operation, whereby the carriage is automatically shifted to a predetermined longitudinal set position, for printing eliminated items upon the same line as the registered items, but in a different column, in which case the paper is not fed during the printing operation of the eliminated items.

With the above mentioned objects in view, the eliminating key 268 is mounted in upper and lower bearing-plates extending from the key-board casing 29ᵃ and side standard 2 respectively, as best shown in Figs. 3, 4 and 5 a coil-spring 316 being connected to the eliminating-key stem and upper bearing plate thereof, whereby the said eliminating-key is held in its normal position. When depressed the eliminating-key 268 is locked down by a pin 317 carried by its stem, the pin being arranged to engage a beveled face hooked end of a spring-controlled latch 318, which latch is fulcrumed upon the stud 250 that also carries the sub-total key 249. The spring-controlled latch 318 carries a pin that has slight play in a slot 319 of a link 320, which link is connected to a vertically disposed end of the rock-arm 231 hereinbefore mentioned, in connection with rod 48 and its key-board releasing mechanism. The lower end of the latch 318 is provided with a rearward extension 318ᵃ, a beveled end of which extension is designed to be opposed by a pin 321 carried by the ribbon-shift arm 262. A lever 322 fulcrumed to an ear of the key-board casing 29ᵃ, having one end in slotted connection with the pin 317 of the eliminating key-stem, the opposite end of the lever 322 being disposed directly under an upwardly curved lip 324 of the spring-controlled plunger-bar 207. The lower end of the stem of the eliminating-key is provided with a foot 325, which foot is designed to engage an arm 326 that extends from the rod 136, the said rod acting in conjunction with the register-release mechanism hereinbefore mentioned.

To effect an eliminating-operation, the eliminating key 268 is depressed prior to a movement of the hand-crank, but after the keys have been actuated indicating the amount of the item. Depression of the eliminating-key causes the latch 318 to swing forward and back over the pin 317, the key being thus locked down. As the eliminating-key moves downward it also rocks the lever 322, which action produces a sliding engagement between the free end of this lever and the curved lip 324 of the plunger-bar 207. The plunger-bar is thus moved a sufficient distance to the right to permit the notch 210 in its depending foot 209 to pass across and beyond the plane where said notch would be alined with the tail of the indicator-actuating dog 202. Thus when the machine is actuated for an eliminated item the registered items-indicator would not record the eliminated item, due to the fact that the dog 202 would be tripped. It will be further observed that although the register may be drawn down at the extreme forward stroke of the hand-crank in an eliminating operation, it will immediately return to normal position owing to the fact that the foot 325 of the eliminating-key stem will not permit the rod 136 and its connected mechanism to swing over and perform their locking function as in an item registration and printing-operation. The ribbon has also been moved to its second position in the eliminating operation by the end of eliminating-key shank exerting force upon the extension 269 of the ribbon-shift arm 262, in a manner hereinbefore mentioned and the eliminated item is printed at the end of the forward stroke of the hand-crank as in the case of a registered item, the said eliminated item being printed below or under the last item in the column, whether this item be an eliminated or registered item, it being understood that if the eliminating-key is depressed successively there would appear a corresponding successive number of eliminated items. As shown in Fig. 3, one end of the spring-controlled lever 327 rests upon a pin 328, also carried by the eliminating-key stem, the lever being fulcrumed to the frame-standard 2 and is provided at its opposite end with an anti-friction roller that is engaged by a cam-wheel 329 fast on the shaft 302, the cam-wheel being directly against or constituting a portion of the adjacent cam-wheel 303. The contour of the working-surface of the cam-wheel 329 is such that when the lever 327 is at rest and in its normal position, its roller rests upon a high face of the said cam-wheel 329. Now if the machine be put in operation, the initial movement of the cam-wheel 329 will cause an abrupt motion to be imparted to the lever 327, the latter will retain its changed position until just before the cam-wheel completes a half revolution, when said lever will be again actuated by the said cam-wheel being brought back into its normal position. The half revolution of the cam-wheel first mentioned is made while the machine completes a full printing-operation, and at the next printing operation of the machine, the cam-wheel 329 is in such position that its lever 327 will make no movement. Hence it will be seen that if lever 327 is permitted to act, it will automatically depress the eliminating-key with each alternate printing operation, thus eliminating from the register every other item in a column, this action being due to the head of the lever 327 coming in contact with the pin 328 of the eliminating-key and thereby forcing the same downward with each alternate printing-operation of the machine. When not utilized the lever 327 is locked by a hand-catch 330. The hand-catch 330 is pivoted to the key-board casing and is provided with a pin 331 that passes into an indenture in the head of said lever 327, in which position the pin 331 locks the lever 327 against operating, the hand-catch being held by a pin that engages a serrated spring secured to the key-board casing. To release the lever 327, this hand-catch is moved so as to clear the pin 331 from its nested position in the indenture of said lever-head, the latter being formed with a throat to permit clearance of said pin 331 when it is moved to effect release of the aforesaid lever.

The mechanism for obtaining automatic shift of the paper-carriage in connection with the eliminating device just described, is best shown in Fig. 7 of the drawings, in which view the spring-controlled hinged angle-plate 297 is shown provided with a series of notches 332. The notches are ten spaces apart or equal to the distance of the combined width of the nested type-bars plus the width of one type. Thus it will be seen that should the paper-carriage be moved the entire distance between the notches 332 in its angle-plate, there would remain a clearance over the full printing capacity of the machine in which another group of figures could be printed, it being understood that said paper-carriage is moved from left to right. Fulcrumed to a rear cross-brace of the machine is a lever 333 having its upper arm provided with a stud for engagement with any one of the series of notches 332 in the angle-plate 297. A coil-spring connects this arm of the lever with the frame cross-brace, the lower arm of the lever being curved outwardly and provided with a roller, which roller engages a cam-wheel 334 that is fast on the shaft 302 before mentioned. The cam-wheel 334 is of the shell variety having diametrically opposite flat high and low quarter sections connected by inclined faces. When the roller of the lever is in its normal position, it rests at the junction of the flat high section and the inclined portion of the cam-wheel, the latter being revolved in the direction, as indicated by the arrow, a half revolution with each printing-operation. Motion being imparted to the cam-wheel 334, it is obvious that the inclined face thereof passing the roller will permit the coil-spring to act upon the lever 333, the same being drawn from left to right by said coil-spring, during a quarter of a revolution of said cam-wheel, which movement slides the paper-carriage in the same direction owing to its connection with said lever. The paper-carriage has now moved from left to right the full distance of ten spaces and the roller of the lever 333 rests at the intersecting point between this lower flat quarter and inclined section of the cam-wheel. The crank-handle having completed its full forward stroke at this time, through its connection, simultaneously releases the printing-mechanism. The paper-carriage will remain in its assumed position just mentioned during the completion of the operation, at which time the roller of lever 333 has reached the junction of the next inclined face of the cam-wheel, the lower face of same having traveled past said roller. In this operation a registered item is printed but the paper-feeding mechanism is disconnected, by mechanism to be hereinafter described, whereby no feed of the paper takes place. At the start of the next printing-operation the opposite inclined face of the cam-wheel 334 will cause the lever 333 to draw the paper-carriage back to its normal or starting position while said cam-wheel makes a quarter of a revolution. A second printing-operation is now accomplished to record an eliminated item, after which printing-operation the aforesaid cam-wheel is returned to the position it assumed at the start of the first or registered item printing-operation. Thus it will be seen that the paper-carriage was first moved to the right and registers an item, but no feed of the paper takes place. At the next operation said paper-carriage was moved to the left, whereby an eliminated item was printed, it being understood that after the printing of the eliminated item and prior to the return of the machine mechanism to its normal position of rest, the paper is fed so as to be in position to receive the next registered item. Thus the paper-feed mechanism must be disconnected and connected alternately in order that the registered and eliminated items appear opposite each other and upon a line common to both.

As best shown in Figs. 7 and 37, to disconnect the paper-feed mechanism when registered items are printed and connect said paper-feed mechanism when eliminated items are printed, the following means are employed: A T-shaped lever 335 is pivotally supported to the rear cross-brace of the frame adjacent to lever 333, the stem arm of the T-shaped lever 335 being connected to the cross-brace by a coil-spring 336, which spring is adapted to hold a stud of one of the cross-arms of the T-shaped lever in engagement with the upper arm of lever 333. The opposite cross-arm of the T-shaped lever extends through a slot 337 in the left-hand frame-standard 2 and in position to engage the dog whose notched face 309 operates the paper-feed lever 307. The lower end of the stem-arm of the T-shaped lever is provided with an anti-friction roller 338, which roller as shown in Figs. 7 and 37 is arranged to be engaged by a shell cam-wheel 339, the latter having semicircular high and low faces and is secured to the shaft 302. As shown in the above referred to figures of the drawings, the roller 338 of the T-shaped lever rests upon the high face the cam-wheel 339 and at its junction with the low face thereof. The paper-carriage in this case is in its extreme left hand or normal starting-position, and the lever 333 is in contact with the cross-arm of the T-shaped lever 335. Movement of the lever 333 to place the paper-carriage in position to print a registered item will free the T-shaped lever, which lever instantly rocks owing, to its roller 338 coming in contact with the low face of said T-shaped lever. The rock of the T-shaped lever causes one of its cross-arms to lift the dog whose notched face 309 controls the paper-feed movement, and said dog at the proper time will consequently oscillate without effecting a feed of the paper platen. The T-shaped lever 335 will thus hold the dog in suspension above pin 308 during this entire operation of the machine, owing to the conformation of cam-wheel 339. At the start of the next forward stroke of the hand-crank however the T-shaped lever will assume its normal position as shown in the drawing, due to the rise in the cam-wheel surface, in which position said T-shaped lever is held while the machine completes its movement, an eliminated item being thus printed. The paper-feed mechanism being now connected, the paper and its printing-roller together with the platen will be revolved a space from the printing-line preparatory to the next operation. By lifting the notched angle-plate 297 from its engagement with the lug of the lever 333, the paper-carriage may be shifted by hand and set to operate in conjunction with said lever 333 in any desired column, within the scope of the paper being used, it being understood that when sheet-paper is used, it is wound upon the platen in the usual manner.

When not in use the automatic shift-mechanism in connection with the paper-carriage may be locked by an adjustable bar 340. This bar is supported by a pin 341 that extends from the rear carriage frame rail 383ª, the bar being in slotted engagement with the pin. The bar 340 is also held against a spur 342 extending from the frame-rail by a leaf-spring secured to the said frame rail and arranged to exert pressure upon said bar. The lower edge of the bar 340 is provided with a series of teeth 343 adapted to engage the spur 342, and by means of which teeth said bar is adjusted and locked within a distance equal to ten spaces, being equivalent to one space more than the width between the first and last type of the entire bank. A pin 344 projecting from the inner end of the adjustable bar 340 is designed to engage the upper arm of the lever 333, and when said adjustable bar is locked in the position shown in Fig. 7, it is apparent that there can be no movement of said lever. Consequently if the machine is operated when the bar is in this position, there would be no shift of the paper-carriage. Upon the other hand if the bar 340 is adjusted to the full extreme in the opposite direction, the paper-carriage would have a corresponding full shift of the spaces. It follows with intermediate adjustment, the paper-carriage would be checked in its shift from left to right by the lever 333 engaging the stop-pin 341 of the adjustable bar.

From the hereinbefore described ribbon-shift mechanism, it follows that when the automatic mechanism for alternately printing registered and eliminated items upon the same line is being utilized, the ribbon is correspondingly shifted to print these items in a distinct color, whereby confusion is avoided when the record is read, the same distinctive result being obtained when these separate items are printed in a single column either alternately or in groups.

We claim:

1. In a calculating machine, a reciprocative frame, a series of type-bars slidably supported upon the frame, springs connecting the type-bars and frame, and key-controlled stops for limiting the movement of the type-bars in one direction.

2. In a calculating machine, a reciprocative frame, a series of slidable type-bars supported by the frame, and springs connecting said frame and type-bars.

3. In a calculating machine, a reciprocative frame, fixed guides for the frame, a series of type-bars slidably guided in said frame, springs in connection with the type-bars and frame, and key-controlled stops for limiting the movement of said type-bars in one direction.

4. In a calculating machine, a reciprocative frame, a series of spring-controlled slidable type-bars carried by the frame, a power-shaft in operative connection therewith, a series of depressible keys for each type-bar, whereby the movement of the same is controlled when one key of its series is depressed, and movable stop means in connection with each series of keys, whereby the type-bars of each key series have a predetermined initial movement with each operation of the power-shaft.

5. In a calculating machine, a reciprocative frame, a series of slidable type-bars supported by the frame, springs connecting said frame and type-bars, independently movable series of type carried by each type-bar, a platen disposed above the series of type, and series of key-controlled stops for limiting the movement of the slidable type-bars.

6. In a calculating machine, a series of key-controlled slidable type-bars, independently movable series of type carried by each type-bar, bell-crank hammers for the type, lugs carried by the hammers, pivoted locking-levers in opposition to the lugs, other lugs carried by said type-bars for actuating the locking-levers after a predetermined initial movement of the said type-bars, fingers extending from said locking levers, the fingers being arranged to overlap each other from left to right, a spring-controlled plunger for each hammer, a universal resetting yoke for said hammers in opposition to the spring-controlled plungers, and a universal tripping-plate for the aforesaid hammers.

7. In a calculating machine, a series of key-controlled slidable type-bars, independently movable series of type carried by each type-bar, spring-controlled hammers for the type, independent locking levers for said hammers, means in connection with the type-bars for releasing the independent locking levers, an oscillating power-shaft, universal hammer setting and releasing means, and means connecting the power-shaft and universal hammer setting and releasing means, whereby the extreme movement of said power-shaft in one direction actuates said universal hammer setting and releasing means, and the extreme movement of the power-shaft in the opposite direction actuates said universal hammer releasing means.

8. In a calculating machine, a series of slidable type-bars, stops projecting from the type-bars, a casing suspended above said type-bars, spring-controlled lineal series of keys mounted in the casing, each lineal series of keys being alined with a type-bar and adapted to engage the stop thereof, plates carried by the aforesaid type-bars, spring-controlled key-locking bails extending longitudinally of each series of keys, the bails being pivotally secured to the casing, fingers depending from the key-locking bails, the fingers being arranged to oppose the type-bar plates, a tooth projecting from each key for engagement with the bail common to its series, and a universal bar in connection with the bails.

9. In a calculating machine, a series of slidable type-bars, stops projecting from the type-bars, a casing suspended above said type-bars, spring-controlled lineal series of keys mounted in the casing, each lineal series of keys being alined with a type-bar and adapted to engage the stop thereof, plates carried by the aforesaid type-bars, spring-controlled key-locking bails extending longitudinally of each series of keys, the bails being pivotally secured to the casing, fingers depending from the key-locking bails, the fingers being arranged to oppose the type-bar plates, a tooth projecting from each key for engagement with the bail common to its series, a universal bar in connection with the bails, key-releasing mechanism in connection with the universal bar, an oscillative power-shaft, and means connecting the power-shaft and key-releasing mechanism, whereby the same is actuated when the power-shaft comes to rest.

10. In a calculating machine, a series of movable type-bars, stops projecting from the type-bars, and a spring-controlled series of depressible keys for engagement with the type-bar stops, means for locking the keys when depressed, a power-shaft, a rotatory cam-wheel in gear-connection with the power-shaft, and means controlled by the cam-wheel for releasing the locking means of depressed keys after each complete movement of the power-shaft.

11. In a calculating machine, a series of slidable type-bars, stops projecting from the type-bars, spring-controlled series of depressible keys for engagement with the type-bar stops, means for locking the keys when depressed, lugs extending from the keys, a slidable locking comb disposed below the key-lugs, a power-shaft, a rotatory cam-wheel in gear-connection with the power-shaft, a spring-controlled dog adapted to be opposed by the cam-wheel, means in connection with the dog for effecting release of the key-locking means at timed intervals, and other means in connection with said dog for actuating the slidable locking comb, whereby the keys are held against depression at timed intervals.

12. In a calculating machine, a series of movable type-bars, stops projecting from the type-bars, spring-controlled lineal series of depressible keys, each series being alined with a type-bar and adapted to engage the stops thereof, spring-controlled key-locking bails common to each series of keys, a universal release-bar for all bails, a key-release lever in operative connection with the universal release-bar, a spring-controlled dog, a spring-controlled latch carried by the dog for intermittent engagement with the key-release lever, a rotatory cam-wheel with which said spring-controlled dog has engagement, a power-shaft and driving-gear for the cam-wheel in connection with the power-shaft.

13. In a calculating machine, a series of movable type-bars, spring-controlled depressible keys for controlling the movement of said type-bars, means for locking the keys in their depressed position, a universal releasing-bar in connection with the key-locking means, a spring-controlled lever in operative connection with the universal release-bar, a thrust-bar suspended from the lever, a release-and-repeat key in link-connection with the thrust-bar, a rotatory cam-wheel, and a key-release lever in operative connection with the cam-wheel and arranged to oppose the thrust-bar end, the position of the thrust-bar relative to the key-release lever being controlled by the release-and-repeat key.

14. In a calculating machine, a series of movable type-bars, spring-controlled depressible keys for controlling the movement of the type-bars, means for locking depressed keys, a lever for releasing the locking means of depressed keys, a cam-controlled key-release lever, and a release-and-repeat key shift mechanism interposed between the cam-controlled key-release lever and the lever for releasing the locking means of depressed keys.

15. In a calculating machine, a series of movable type-bars, spring-controlled depressible keys for controlling the movement of the type-bars, means for locking depressed keys, a lever for releasing the locking means of depressed keys, means for actuating the lever for releasing the locking means of depressed keys, an oscillative power-shaft, an arm carried by the power-shaft, and a locking-bar in link-connection with said lever for releasing depressed keys, the locking bar being arranged to come into the path of travel of the power-shaft arm when the aforesaid lever for releasing the locking means is actuated to effect a release of keys.

16. In a calculating machine, a series of movable type-bars, spring-controlled depressible keys for controlling the movement of the type-bars, means for locking depressed keys, a lever for releasing the locking means of depressed keys, a cam-controlled key release lever, and an adjustable connection between the cam-controlled key-release lever and the lever for releasing the locking means of depressed keys.

17. In a calculating machine, a series of movable type-bars, spring-controlled depressible keys for controlling the movement of the type-bars, means for locking depressed keys, a lever for releasing the locking means of depressed keys, a cam-controlled key-release lever, an adjustable connection between the cam-controlled key-release lever and the lever for releasing the locking means of depressed keys, and a manually set repeat and release key in connection with the adjustable connection between the cam-controlled lever and lever for releasing the locking means of depressed keys.

18. In a calculating machine, a series of movable type-bars, spring-controlled depressible keys for controlling the movement of the type-bars, means for locking depressed keys, a lever for releasing the locking means of depressed keys, a cam-controlled key-release lever, an adjustable connection between the cam-controlled key-release lever and the lever for releasing the locking means of depressed keys, and a manually set repeat-and-release key in connection with the adjustable connection between the cam-controlled lever and lever for releasing the locking means of depressed keys, and means for holding the repeat-and-release key in its set repeat position.

19. In a calculating machine, a series of movable type-bars, spring-controlled depressible keys for controlling the movement of the type-bars, an indicating register, a disengaging feeding means in connection with the indicating register, and a plunger-bar in universal connection with the depressible keys whereby the disengaging feed of said indicating register is controlled.

20. In a calculating machine, a series of movable type-bars, spring-controlled depressible keys for controlling the movement of the type-bars, an indicator comprising a pair of spring-controlled registering dials, intermittently actuated transfer mechanism connecting the registering dials, means in connection with each dial for automatic return of the same to zero, a disengaging feed mechanism in connection with one of the dials, and a plunger-bar in universal connection with the depressible keys, whereby the disengaging feed-mechanism is controlled.

21. In a calculating machine, a series of movable type-bars, spring-controlled depressible keys for controlling the movement of the type-bars, means for locking depressed keys, a lever for releasing the locking means of depressed keys, a cam-controlled key-release lever, an adjustable connection between the cam-controlled key-release lever and the lever for releasing the locking means of depressed keys, a manually set repeat-and-release key in connection with the adjustable connection between the cam-controlled lever and lever for releasing the locking means of depressed keys, means for holding the repeat-and-release key in its set repeat position, an indicating register, a feed-mechanism therefor, a dog in disengaging connection with the register feed-mechanism, a power-shaft, actuating means connecting the power-shaft and dog, and a plunger-bar in universal connection with the depressible keys, whereby the position of the dog is controlled with relation to said register-feed mechanism.

22. In a calculating machine, a series of slidable type-bars, spring-controlled stops carried by the type-bars, the stops being adapted to yield in one direction, and series of depressible keys for engagement with the stops of the type-bars in the opposite direction from which said stops have yield.

23. In a calculating machine, a series of key-controlled slidable type-bars, type-carriers having one end thereof in shackle-connection with the type-bars, vertically reciprocative type mounted in the type-carriers, and guides for said carriers opposite their shackle-connection with the type-bars.

24. In a calculating machine, a series of key-controlled horizontally movable type-bars, racks carried by the bars, a vertically movable register-frame disposed above the type-bars, fixed guides for the frame, a series of pinion-carrying calculating-wheels mounted in the frame for engagement with said type-bar racks, a shaft, arms fast to the shaft and connected to the register-frame, an intermediate arm extending from the shaft, a cam-block for engagement with the arm, a power-shaft, and means in connection with the cam-block and power-shaft, whereby said cam-block is moved to cause engagement of the pinions of the calculating-wheels and aforesaid type-bar racks.

25. In a calculating machine, a series of key-controlled horizontally movable type-bars, a series of vertically movable type in connection with the type-bars, a printing-platen disposed above the movable type, spring-controlled printing-hammers for engagement with said type, racks carried by said type-bars, a series of toothed calculating-wheels normally disposed above said type-bar racks, a power-shaft, means in connection with the power-shaft for imparting movement to the aforesaid type-bars, whereby their type are brought to a common printing-line under the printing-platen, time-controlled means in connection with said power-shaft for effecting release of the spring-controlled printing-hammers after movement of the type-bars to the printing-line, other time-controlled means in connection with the aforesaid power-shaft and toothed calculating-wheels, whereby the same are moved and locked into engagement with the type-bar racks after release of the printing-hammers, means for returning said type-bars to their normal position after engagement of said calculating-wheels therewith, and means for effecting release of the aforesaid toothed calculating-wheels from their locked engagement with said type-bar racks after the type-bars have been restored to their normal position.

26. In a calculating machine, a series of rack-carrying horizontally slidable type-bars, series of depressible keys for controlling movement of the type-bars, a register-mechanism comprising a series of toothed calculating-wheels suspended above the racks of the type-bars with which racks the toothed calculating-wheels of the register are adapted to engage, arms connecting the register-mechanism, a slidable cam-block arranged to actuate one of the arms, a spring-controlled tumbler adapted to engage and lock said arm when the same has been actuated by the slidable cam-block, a tripping-mechanism in connection with the tumbler, and means controlled by the slidable type-bars for actuating the tripping-mechanism.

27. In a calculating machine, a total-register mechanism comprising a series of vertically movable calculating-wheels, pinions carried by the calculating-wheels, a series of horizontally slidable key-controlled type-bars, racks carried by the type-bars for engagement with said calculating-wheel pinions, movable spring-controlled guide-blocks carried by said type-bars adjacent to one end of their rack, whereby engagement and disengagement of said racks and calculating-wheel pinions is controlled, and a universal stop-bar for the blocks.

28. In a calculating machine, a total-register comprising a frame, a series of calculating-wheels mounted therein, pinions carried by the calculating-wheels, a series of movable racks for intermittent engagement with the pinions, independent spring-controlled slidable carrying-plates supported upon the register-frame for each pinion, feed-pawls pivoted to the carrying-plates for engagement with said pinions, timed mechanism in connection with the feed-pawls for holding the same out of engagement with the aforesaid pinions during their engagement with the movable racks, a universal loading-bar in opposition to the spring-controlled slidable carrying-plates, whereby the latter are moved against their spring-pressure, stops for said carrying-plates, tripper-dogs mounted upon the frame adapted to lock the aforesaid carrying-plates when the latter are moved by the universal loading-bar, and a pin carried by each calculating wheel for engagement with the tripper-dogs.

29. In a calculating machine, a frame, a series of calculating wheels mounted in the frame, pinions carried by the wheels, a series of racks for intermittent engagement with the pinions, spring-controlled carrying plates for each pinion supported by the frame, feed-pawls pivoted to the plates for engagement with said pinions, means for raising and lowering the feed-pawls at timed intervals, tripper-dogs for locking said carrying-plates in opposition to their spring-control, releasing means for the tripper-dogs carried by each calculating-wheel, spring-controlled latches for holding said tripper-dogs in their released position, a universal loading-bar for engagement with the aforesaid tripper-dogs and latches whereby they are simultaneously restored to their set positions, a tooth carried by each calculating-wheel, and a universal bar for engagement with the teeth of all calculating-wheels, whereby they are alined.

30. In a calculating machine, a series of adjustable type-bars, racks carried by the type-bars, a slidable supporting-frame for said type-bars, a reciprocative register-frame, a series of calculating-wheels mounted in the frame, pinions carried by the calculating-wheels for engagement with the racks, an independent spring-actuated transfer-mechanism for each calculating-wheel pinion, means for locking the transfer-mechanism, means carried by the calculating-wheels for releasing the transfer locking mechanism, mechanism in connection with the register-frame whereby the aforesaid calculating-wheel pinions are brought into engaging-position relative to the type-bar racks, means for locking the register-frame in such engaging-position, releasing-mechanism in connection with the register-frame locking-means, tappet-fingers carried by the type-bar supporting frame for engagement with the releasing-mechanism, and means for shifting said releasing mechanism relative to the tappet-fingers, whereby the time of release of the register-frame is controlled.

31. In a calculating machine, a series of adjustable type-bars, racks secured thereto, means for imparting back-and-forth motion to the type-bars, a total-register comprising a series of pinion-carrying calculating-wheels for intermittent engagement with the racks, an independent spring-controlled transfer-mechanism for each calculating-wheel, a cam-wheel, means for imparting a full rotation to the cam-wheel with each back-and-forth motion of the type-bars, and a loading-bar in connection with the cam-wheel and each register transfer-mechanism, whereby the same are set.

32. In a calculating machine, a series of slidable type-bars, racks secured to the bars, a total-register comprising a series of pinions carrying calculating-wheels for intermittent engagement with the racks, an independent spring-controlled transfer-mechanism for each calculating-wheel, a series of depressible keys for controlling the slidable type-bars, means for locking the keys when depressed, a loading-bar in connection with the register transfer-mechanism, a key-releasing mechanism in connection with the key-locking means, a shaft, cam-wheels carried by the shaft in connection with the loading-bar of said transfer-mechanism and the key-releasing mechanism, a pinion secured to the shaft, a plate having oppositely disposed racks for engagement with the pinion, a rock-shaft, and means in connection with the rock-shaft and plate, whereby the latter is reciprocated and shifted to cause alternate engagement of its racks with the pinion and thus impart a complete rotation to the pinion in the same direction for each forward and backward movement of the rock-shaft.

33. In a calculating machine, a total-register comprising a series of calculating-wheels, an independent spring-controlled transfer-mechanism for each wheel, means in connection with the wheels for releasing the transfer-mechanism, a loading-bar for resetting said transfer mechanism, a two-part expansible strap-member connected to the loading-bar, and a cam-wheel with which the two parts of the strap member have engagement, whereby the reset of the transfer-mechanism is controlled.

34. In a calculating machine, a total register mechanism comprising a series of calculating-wheels, slidable type-bars for actuating the register wheels, an independent spring-controlled transfer-mechanism for each wheel, means carried by said register wheels for tripping the transfer mechanism, depressible keys for controlling the type-bar movements, means for locking depressed keys, and a universal bar for resetting the spring-controlled register transfer mechanism.

35. In a calculating machine, a shaft, actuating cam-wheels carried by the shaft, a pinion secured to the shaft, a rock-shaft, a plate having oppositely disposed racks for engagement with the pinion, a centrally disposed double-track in connection with the plate, a fixed guide-pin engaged by the track, a rocker-shaft, a shank extending from the plate constituting a guide in connection with the rocker-shaft, a slotted arm carried by the plate shank, an arm secured to the rocker-shaft for engagement with the shank slot, and coil-springs connecting the plate and arm upon opposite sides of said rocker-shaft.

36. In a calculating machine, a series of spring-controlled type-bars, racks secured to the type-bars, a total register comprising pinion-carrying calculating-wheels for engagement with the racks, a tooth carried by each calculating-wheel, a universal bar for engagement with the calculating-wheel teeth, whereby said calculating-wheels are alined, a power-shaft, a crank loosely mounted upon the power-shaft, means connecting the crank and total-register, whereby the same is set with relation to the said type-bar racks when the crank has movement independent of the power-shaft, and other means connecting the universal bar of the register and crank, whereby said bar is moved into the path of travel of the calculating-wheels incidental to said movement of the crank upon said power-shaft.

37. In a calculating machine, a series of slidable type-bars, racks carried by the type-bars, a power-shaft in connection with said type-bars, a crank loosely mounted upon the power-shaft, a total-register comprising a series of pinion-carrying calculating wheels for engagement with the type-bar racks, means in connection with the total-register and crank whereby said total register is moved into position to be engaged by the type-bar racks, means carried by the aforesaid register for controlling rotation of its calculating-wheels when actuated by said type-bar racks, and other means connecting said crank and controlling means of the aforesaid calculating-wheels whereby said controlling means is actuated.

38. In a calculating machine, a series of key-controlled type-bars, a total-register mechanism disposed above the type-bars, a roller-platen, a transversely movable ribbon disposed under the roller-platen, a power-shaft, a crank loosely mounted thereon, means connecting the total-register and crank, whereby movement of the latter upon the power-shaft causes the register to engage the type-bars, means connecting the crank and power-shaft, whereby the latter is actuated in conjunction with said crank to effect a printing-operation, and a compound lever system in connection with the transversely movable ribbon, whereby the latter is shifted by a movement of the crank upon the power-shaft prior to a printing-operation.

39. In a calculating machine, a series of key-controlled type-bars, vertically movable type carried by the type-bars, racks secured to said type-bars, a roller-platen located above the type, a transversely movable ribbon disposed between said type and platen, a vertically movable register comprising series of pinion-carrying calculating-wheels for engagement with the type-bar racks, a universal bar for engagement with all calculating-wheels whereby they are alined, a power-shaft in operative connection with said type-bars, a crank-hub loosely mounted upon the power-shaft, a lug extending from the crank-hub, a finger in opposition to the lug, means connecting the finger and vertically movable register, an arm secured to said power-shaft, a nose extending from the crank-hub for engagement with the arm, a cross-shaft, an arm secured thereto, a strap connecting the arm, a coil-spring in connection with the arm secured to the aforesaid power-shaft, another arm secured to the cross-shaft in opposition to the universal bar of the register, an arm loosely mounted upon said cross-shaft and engaging the last named arm of the aforesaid cross-shaft, and means connecting the loosely mounted arm of the cross-shaft with the transversely movable ribbon, whereby the same is shifted.

40. In a calculating machine, a series of movable type-bars, keys for controlling the movement of the type-bars in an item-printing operation, a total-register for engagement with the type-bars, a power-shaft, means in connection with the total-register and power-shaft, whereby said total-register is moved into engagement with said type-bars after an item-printing operation, a crank having loose engagement in one direction with the power-shaft, means connecting the crank and total-register, whereby the latter is moved into engagement with the aforesaid type-bars prior to a printing-operation, means for locking the total-register in such engagement, means for releasing the total-register after the same has been actuated by a return movement of the type-bars, an indicating register, means for actuating the same in connection with each item-printing operation, and means in connection with the indicating register whereby the same is returned to zero after each printing-operation incidental to movement of the crank in effecting movement of the total-register prior to a printing-operation.

41. In a calculating machine, a power-shaft, a crank loosely mounted thereon, an arm in connection with the crank, an indicator comprising a pair of registering dials, a spring-controlled rocker-plate, clutch-dogs mounted upon the rocker-plate for engagement with the dials, and a latch for engagement with the rocker-plate in connection with the arm, whereby the indicator dials are freed from the clutch-pawls upon a movement of the arm.

42. In a calculating machine, a series of slidable type-bars, a series of depressible keys for controlling the movement of the type-bars in one direction, mechanism for locking depressed keys, means for releasing depressed keys, a printing-mechanism, a transversely movable ribbon therefor, a register adapted to be actuated by said type-bars, mechanism for locking the register in operative position relative to the aforesaid type-bars, a power-shaft, a crank mounted upon the power-shaft and having independent movement thereon in one direction, an arm in connection with the crank, the arm being actuated by the independent movement of said crank with relation to said power-shaft, means connecting said arm and ribbon whereby the latter is shifted, means connecting the aforesaid arm for effecting release of the register locking means, means connecting the arm and the locking means of the depressible keys, whereby the said locking means are released, locking mechanism for the arm, and means connecting the locking mechanism of said arm and said releasing means for depressed keys, whereby the said locking mechanism of the aforesaid arm is released when said releasing means for depressed keys are actuated.

43. In a calculating machine, a series of slidable type-bars, a series of depressible keys for controlling the movement of the type-bars in one direction, mechanism for locking depressed keys, means for releasing depressed keys, a printing-mechanism, a transversely movable ribbon therefor, a total-register adapted to be actuated by said type-bars, mechanism for locking the total-register in operative position relative to the aforesaid type-bars, a power-shaft, a crank mounted upon the power-shaft and having independent movement thereon in one direction, an arm in connection with the crank, the arm being actuated by the independent movement of said crank with relation to said power-shaft, means connecting said arm and ribbon whereby the latter is shifted, means connected to the aforesaid arm for effecting release of said total-register locking mechanism, means connecting the arm and the locking means of depressed keys, whereby the said locking means are released, locking mechanism for the arm, a sub-total key in connection with the arm locking means, and means controlled by the aforesaid power-shaft whereby said arm locking mechanism is released by the sub-total key in connection with the aforesaid arm locking means.

44. In a calculating machine, a series of slidable type-bars, a series of depressible keys for controlling the movement of the type-bars in one direction, mechanism for locking depressed keys, means for releasing depressed keys, a printing mechanism, a transversely movable ribbon therefor, a total-register adapted to be actuated by said type-bars, mechanism for locking the total-register in operative position relative to the aforesaid type-bars, a power-shaft, a crank mounted upon the power-shaft and having independent movement thereon in one direction, an arm in connection with the crank, the arm being actuated by the independent movement of said crank with relation to said power-shaft, means connecting said arm and ribbon whereby the latter is shifted, means connected to the aforesaid arm for effecting release of said total register locking mechanism, means connecting the arm and the locking means of depressed keys whereby the said locking means are released, locking mechanism for the arm, a sub-total key, a release-plate pivoted to the aforesaid arm locking mechanism, a link in connection with the release-plate, means for locking the sub-total key, and other means controlled by the aforesaid power-shaft for engaging the release-plate, whereby the arm and sub-total key are simultaneously unlocked.

45. In a calculating machine, a series of slidable type-bars, a series of depressible keys for controlling the movement of the type-bars in one direction, mechanism for locking depressed keys, means for releasing depressed keys, a printing-mechanism, a transversely movable ribbon therefor, a total-register adapted to be actuated by said type-bars, mechanism for locking the total-register in operative position relative to the aforesaid type-bars, a power-shaft, a crank mounted upon the power-shaft and having independent movement thereon in one direction, an arm in connection with the crank, the arm being actuated by the independent movement of said crank with relation to said power-shaft, means connecting said arm and ribbon whereby the latter is shifted, means connected to the aforesaid arm for effecting release of said total-register locking mechanism, means connecting the arm and the locking means of depressed keys whereby the said locking means are released, locking mechanism for the arm, an indicating register comprising a pair of rotatory register-dials, a rocker-plate, clutch-dogs carried by the rocker-plate for engagement with the register-dials, a latch pivoted to said arm in engagement with the rocker-plate, a depressible sub-total key in connection with the aforesaid arm-locking means, a catch-dog carried by the sub-total key for actuating the latch, whereby the same is disengaged from said rocker-plate, a pin in connection with the arm for locking-engagement with said catch-dog, and means controlled by the power-shaft for releasing the arm-locking mechanism together with the sub-total key when the latter has been depressed and locked.

46. In a calculating machine, a reciprocative frame, a series of slidable rack-carrying type-bars, means for moving the type-bars carried by the frame to and from a printing-line, a movable total-register, means for moving the register into engaging position with the racks of the type-bars after the latter have been moved to the printing-line, and a manually operative eliminating-key in connection with the means for moving said register, whereby the latter is held out of its engaging position with relation to said type-bars when said eliminating-key is manually operated.

47. In a calculating machine, a series of slidable rack-carrying type-bars, means for moving the type-bars to and from a printing-line, a movable total-register, means for moving the register into engaging position with the racks of the type-bars after the latter have been moved to the printing-line, a manually operative eliminating key in connection with the means for moving said register, whereby the latter is held out of its engaging position with relation to said type-bars when said eliminating-key is manually operated, means for locking the eliminating-key when operated, an indicating-register, a feed-mechanism therefor, and means connecting the indicating-register feed-mechanism and eliminating-key, whereby said feed-mechanism is disconnected from said indicating-register when the aforesaid eliminating-key is operated, and means for releasing the eliminating-key locking means.

48. In a calculating machine, a series of slidable type-bars, a series of depressible keys for controlling the movement of the keys in one direction, mechanism for locking depressed keys, means for releasing depressed keys, a printing-mechanism, a transversely movable ribbon therefor, shifting mechanism for the ribbon, a total-register adapted to be actuated by said type-bars, mechanism for locking the total-register in operative position relative to the aforesaid type-bars, an indicating-register, feed-mechanism for the indicating-register, means for effecting release of said indicating-register feed-mechanism, a manually operative eliminating-key, locking mechanism in connection with the releasing means of depressed keys, means in connection with said eliminating-key and feeding-mechanism of the aforesaid indicating-register, engaging means carried by the total-register locking mechanism in opposition to the eliminating key, whereby the locking mechanism is controlled by said eliminating-key when the same is manually operated, and means carried by the ribbon-shift mechanism for engagement with the aforesaid eliminating-key whereby the ribbon is shifted upon a manual-operation of the eliminating-key.

49. In a calculating machine, a series of slidable type-bars, a platen, a transversely movable ribbon under the platen, mechanism for shifting the ribbon, means for moving the type-bars to a common printing-line under the platen, racks secured to said type-bars, an adjustable total-register, means for adjusting the register into engaging position with the type-bar racks, after the latter have been moved to the printing-line, and a manually operative eliminating-key in connection with the means for adjusting the register, whereby the same is held out of engagement with said racks when the eliminating-key is operated, means for locking said eliminating-key when operated, and means carried by the ribbon-shift mechanism for releasing the locking means of the aforesaid eliminating-key incidental to shift of the ribbon.

50. In a calculating machine, a printing-mechanism, a paper-carrying platen-roller above the same, a shaft disposed parallel to the platen-roller, feed-rollers carried by the shaft, a clutch-member secured to said shaft, a clutch-plate loosely mounted on the aforesaid shaft, a spring-controlled rocker in link-connection with the clutch-plate, whereby feed of the paper-carrying platen-roller is had, an actuating-dog for engagement with the rocker in opposition to its spring-control thereof, and cam-controlled means in opposition to the dog, whereby the same is disengaged from said rocker at alternate feeding intervals of the paper-carrying platen-roller.

51. In a calculating machine, a series of slidable rack-carrying type-bars, means for moving the type-bars to and from a printing-line, an adjustable total-register, means for adjusting the register into engaging-position for engagement with the racks of the type-bars, after the latter have been moved to the printing-line, a spring-controlled eliminating-key in connection with the adjusting means of said register, a cam-controlled lever in connection with said eliminating-key, and a manually operative lock-and-release lever for engagement with the cam-controlled lever, whereby movement of the same is regulated with relation to its cam-controlled lever.

52. In a calculating machine, a series of slidable rack-carrying type-bars, means for moving the type-bars to and from a printing-line, an adjustable total-register, means for adjusting the register into engaging position for engagement with the racks of the type-bars, after the latter have been moved to the printing-line, a spring-controlled eliminating-key in connection with the adjusting means of said register, a rotating cam-wheel, a lever in connection with the cam-wheel and said eliminating-key, whereby the latter is actuated with each movement of said type-bars to the printing-line, and means for disconnecting the lever from the cam-wheel and the aforesaid eliminating-key.

53. In a calculating machine, a printing-mechanism, a revoluble paper-carrying platen-roller, a feed-roller arranged parallel to the platen-roller, oscillating hangers for the feed-roller, and a cam controlled actuating mechanism in connection with the hangers, whereby said feed-roller is moved into operative engagement with said platen-roller.

54. In a calculating machine, a printing-mechanism, a series of movable type-bars adapted to be brought to a common printing-line, a register, a cam-controlled register-setting mechanism for causing alternate actuating engagement of the register with the type-bars incidental to successive printing-operations, a longitudinally movable paper-carriage arranged over the printing-line, a paper-carrying platen-roller mounted upon the carriage, feed-mechanism in connection with the platen-roller, time-controlled means connecting the platen-roller feed-mechanism and register-setting mechanism, whereby said feed-mechanism is disconnected from the platen alternately incidental to successive printing-operations, and cam-controlled shifting-mechanism in connection with the paper-carriage, whereby the same is moved to different longitudinal positions alternately incidental to successive printing-operations.

55. In a calculating machine, a longitudinally movable paper-carriage, a notched plate carried by the carriage, a lever adjustable in any one of the notches, and a cam-wheel for actuating the lever, whereby the position of the carriage is alternately changed incidental to successive printing-operations.

56. In a calculating machine, a printing-mechanism, a longitudinally movable paper-carriage, a notched plate carried by the carriage, a lever adjustable in any one of the notches, a cam-wheel for actuating the lever, whereby the position of the carriage is alternately changed incidental to successive printing-operations, and an adjustable stop for limiting the movement of said carriage in one direction.

57. In a calculating machine, a printing-mechanism, a longitudinally movable paper-carrying platen-roller located above the printing-mechanism, mechanism for automatic alternate shift of the platen-roller in a longitudinal direction, incidental to successive printing-operations, a feed-mechanism for imparting rotation to said platen-roller with which it is engaged, and a cam-controlled lever for effecting alternate disengagement of the feed-mechanism, incidental to successive printing-operations.

58. In a calculating machine, a series of slidable type-bars, type carried by the type-bars, a platen, a transversely shiftable ribbon interposed between the type and platen, a series of spring-controlled hammers for the type, locking-levers for the hammers, shifting means in connection with the ribbon, a power-shaft, a hand-crank mounted upon the power-shaft having independent movement thereon in one direction, means connecting the hand-crank and ribbon-shifting means whereby the latter is actuated when the hand-crank is moved independently of the power-shaft, and a lever in connection with the ribbon-shifting means and the first two of the series of locking-levers whereby the same are actuated.

59. In a calculating machine, a total-register mechanism comprising a series of calculating-wheels, slidable type-bars for actuating the register-wheels, an independent spring-controlled transfer-mechanism for each wheel, means carried by said register-wheels for tripping the transfer-mechanism, depressible keys for controlling the type-bar movements, means for locking depressed keys, a universal bar for resetting the spring-controlled register transfer-mechanism, a shaft, actuating cam-wheels carried by the shaft for controlling the key-locking means of the register, a pinion secured to the shaft, a plate having oppositely disposed racks for engagement with the pinion, a centrally disposed double track in connection with the plate, a fixed guide-pin engageable with the track, a rocker-shaft, a slotted shank extending from the plate constituting a guide in connection with the rocker-shaft, a slotted arm carried by the shank, an arm secured to the rocker-shaft for engagement with the slot of the arm carried by the shank, and coil-springs connecting the plate and rocker-shaft arm upon opposite sides of said rocker-shaft.

In testimony that we claim the foregoing, we have each of us set our hands in the presence of two witnesses.

JAMES MALLMANN.
GEORGE BROWNING.

Witnesses for James Mallmann:
  WM. H. GRUBE,
  W. C. ROENIT.
Witnesses for George Browning:
  M. H. HOEY,
  FRANK A. O'NEIL.